US011381980B2

(12) United States Patent
Choi et al.

(10) Patent No.: US 11,381,980 B2
(45) Date of Patent: Jul. 5, 2022

(54) METHOD AND APPARATUS FOR ESTABLISHING CELL OF BASE STATION IN WIRELESS COMMUNICATION SYSTEM

(71) Applicant: Samsung Electronics Co., Ltd., Suwon-si (KR)

(72) Inventors: Chanho Choi, Hwaseong-si (KR); Seijoon Shim, Seoul (KR); Chongdon Kim, Seongnam-si (KR); Hayoung Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 16/753,464

(22) PCT Filed: Sep. 4, 2018

(86) PCT No.: PCT/KR2018/010240
§ 371 (c)(1),
(2) Date: Apr. 3, 2020

(87) PCT Pub. No.: WO2019/078484
PCT Pub. Date: Apr. 25, 2019

(65) Prior Publication Data
US 2021/0377743 A1 Dec. 2, 2021

(30) Foreign Application Priority Data
Oct. 16, 2017 (KR) .................. 10-2017-0134201

(51) Int. Cl.
*H04W 16/18* (2009.01)
*H04L 5/00* (2006.01)
(Continued)

(52) U.S. Cl.
CPC .......... *H04W 16/18* (2013.01); *H04B 17/318* (2015.01); *H04L 5/0035* (2013.01);
(Continued)

(58) Field of Classification Search
CPC ..... H04W 16/18; H04W 16/24; H04W 16/10; H04W 88/08; H04B 17/318; H04L 5/0035; H04L 5/0062; H04L 5/0091
See application file for complete search history.

(56) References Cited

U.S. PATENT DOCUMENTS

2011/0267937 A1   11/2011   Yoo et al.
2012/0044796 A1*  2/2012    Yoon .................. H04L 27/261
                                                370/208
(Continued)

FOREIGN PATENT DOCUMENTS

KR   10-2011-0051096 A   5/2011
KR   10-2013-0038804 A   4/2013
(Continued)

OTHER PUBLICATIONS

Extended European Search Report dated Oct. 27, 2020, issued in European Patent Application No. 18868429.4.
(Continued)

*Primary Examiner* — Kevin C. Harper
*Assistant Examiner* — Derrick V Rose
(74) *Attorney, Agent, or Firm* — Jefferson IP Law, LLP

(57) ABSTRACT

The present invention relates to a method and an apparatus for establishing a cell using system information of neighboring cells on the basis of interference environments of the neighboring cells in a wireless communication system. The method according to the present invention comprises the steps of: detecting, by a base station, cell IDs of neighboring cells by using synchronization signals transmitted from the neighboring cells; checking whether resources, to which common reference signals (CRS) transmitted from the neighboring cells are transmitted, overlap with each other, on the basis of the cell IDs; estimating channels of the neighboring cells by using the CRSs; and determining an
(Continued)

interference environment for establishing a cell by using the result of the checking and the estimated channels.

15 Claims, 12 Drawing Sheets

(51) Int. Cl.
*H04W 16/24* (2009.01)
*H04W 88/08* (2009.01)
*H04W 48/16* (2009.01)
*H04B 17/318* (2015.01)
*H04W 16/10* (2009.01)

(52) U.S. Cl.
CPC .......... *H04L 5/0062* (2013.01); *H04L 5/0091* (2013.01); *H04W 16/10* (2013.01); *H04W 16/24* (2013.01); *H04W 48/16* (2013.01); *H04W 88/08* (2013.01)

(56) References Cited

U.S. PATENT DOCUMENTS

| | | |
|---|---|---|
| 2012/0087261 A1 | 4/2012 | Yoo et al. |
| 2012/0113846 A1 | 5/2012 | Narasimha et al. |
| 2012/0225680 A1 | 9/2012 | Suh |
| 2012/0329400 A1 | 12/2012 | Seo et al. |
| 2013/0114435 A1 | 5/2013 | Wang et al. |
| 2014/0192671 A1 | 7/2014 | Lim et al. |
| 2014/0204765 A1 | 7/2014 | Chai et al. |
| 2014/0254419 A1* | 9/2014 | Chun ................ H04L 1/00 370/252 |
| 2015/0117392 A1* | 4/2015 | Hammarwall ....... H04B 17/382 370/330 |
| 2016/0066334 A1 | 3/2016 | Jin et al. |
| 2016/0352442 A1 | 12/2016 | Xu |
| 2018/0302176 A1 | 10/2018 | Jeon et al. |
| 2018/0302842 A1* | 10/2018 | Sugirtharaj ....... H04W 74/0808 |

FOREIGN PATENT DOCUMENTS

| | | |
|---|---|---|
| KR | 10-2014-0044366 A | 4/2014 |
| KR | 10-2014-0074341 A | 6/2014 |
| WO | 2013/051839 A2 | 4/2013 |
| WO | 2016/032264 A1 | 3/2016 |
| WO | 2017/065453 A1 | 4/2017 |

OTHER PUBLICATIONS

A Decision to Grant dated Mar. 22, 2022, issued in a counterpart Korean Application No. 10-2017-0134201.

* cited by examiner

METHOD AND APPARATUS FOR ESTABLISHING CELL OF BASE STATION IN WIRELESS COMMUNICATION SYSTEM

TECHNICAL FIELD

The disclosure relates to a wireless communication system, and more particularly to a method and an apparatus for use by a base station to establish a cell in a wireless communication system.

BACKGROUND ART

Generally, mobile communication systems were originally developed to provide voice services while enabling user movement. Mobile communication systems have gradually expanded from voice services to data services and have been developed to currently be capable of providing high-speed data services. However, because mobile communication systems currently providing service have insufficient resources and users demand for higher-speed services, more advanced mobile communication systems are required.

In response to these demands, the standardization of a long-term-evolution (LTE) system, developing as one next-generation mobile communication system, is ongoing under the 3rd Generation Partnership Project (3GPP). LTE is technology for implementing high-speed packet-based communication having a transmission rate of up to 100 Mbps for commercialization by the year of 2010. To this end, various methods are under discussion, for example, a method of reducing the number of nodes positioned on a communication path by simplifying the structure of a network or a method of using wireless protocols as close to a wireless channel as possible.

In LTE, each base station always transmits a common reference signal (CRS), except in a specific situation, and may transmit system information or data information by allocating a physical downlink shared channel (PDSCH) at a specific resource position when it is necessary to transmit the system information or data information to a terminal in a cell thereof. Inter-cell interference occurs where a small cell and a macrocell overlap each other, for example, at a cell edge, which causes deterioration in performance.

A base station of a cell exchanges information about transmission resources with a neighboring base station through an X2 message. The base stations, having exchanged the information with each other, may independently use data resources in transmission to terminals close to each base station because the terminals are distant from an interfering cell. However, a CRS from a neighboring cell is always transmitted, and thus functions as interference.

In an environment having no information exchange between neighboring cells, each base station transmits a data signal to a terminal in a cell thereof when needed without considering signal transmission by an adjacent cell. Arbitrary data transmission by each base station functions as interference from the perspective of a receiver. Even though inter-cell cooperation is performed, since each base station independently allocates data resources to terminals at the center of a cell, a SON base station at a distant location may receive not only CRS interference but also data interference. Therefore, discussion is necessary to solve these problems.

DETAILED DESCRIPTION OF INVENTION

Technical Problem

The disclosure has been made in view of the above-mentioned problems, and an aspect of the disclosure is to provide a method and an apparatus for establishing a cell using system information of detected neighboring cells by determining an interference environment of neighboring cells in a wireless communication system.

Solution to Problem

In accordance with an aspect of the disclosure, a method in which a base station establishes a cell in a wireless communication system includes: detecting cell IDs of neighboring cells using synchronization signals transmitted from the neighboring cells; identifying, based on the cell IDs, whether resources for transmitting common reference signals (CRSs) transmitted from the neighboring cells overlap each other; estimating channels of the neighboring cells using the CRSs; and determining an interference environment to establish a cell using a result of identification and the estimated channels.

In accordance with another aspect of the disclosure, a base station for establishing a cell in a wireless communication system includes: a transceiver configured to transmit and receive a signal from a neighboring cell; a controller configured to detect cell IDs of neighboring cells using synchronization signals transmitted from the neighboring cells, to identify, based on the cell IDs, whether resources for transmitting common reference signals (CRSs) transmitted from the neighboring cells overlap each other, to estimate channels of the neighboring cells using the CRSs, and to determine an interference environment in order to establish a cell using a result of identification and the estimated channels; and a storage unit configured to store information obtained by detecting a signal received from the neighboring cells.

Advantageous Effects of Invention

According to the disclosure, it is possible for a base station to establish a cell by determining an interference environment of neighboring cells and by obtaining system information of the neighboring cells even in an environment having no inter-cell cooperation or a low signal-to-noise ratio (SNR) using a suitable interference mitigation method.

MODE FOR THE INVENTION

Figure 1:
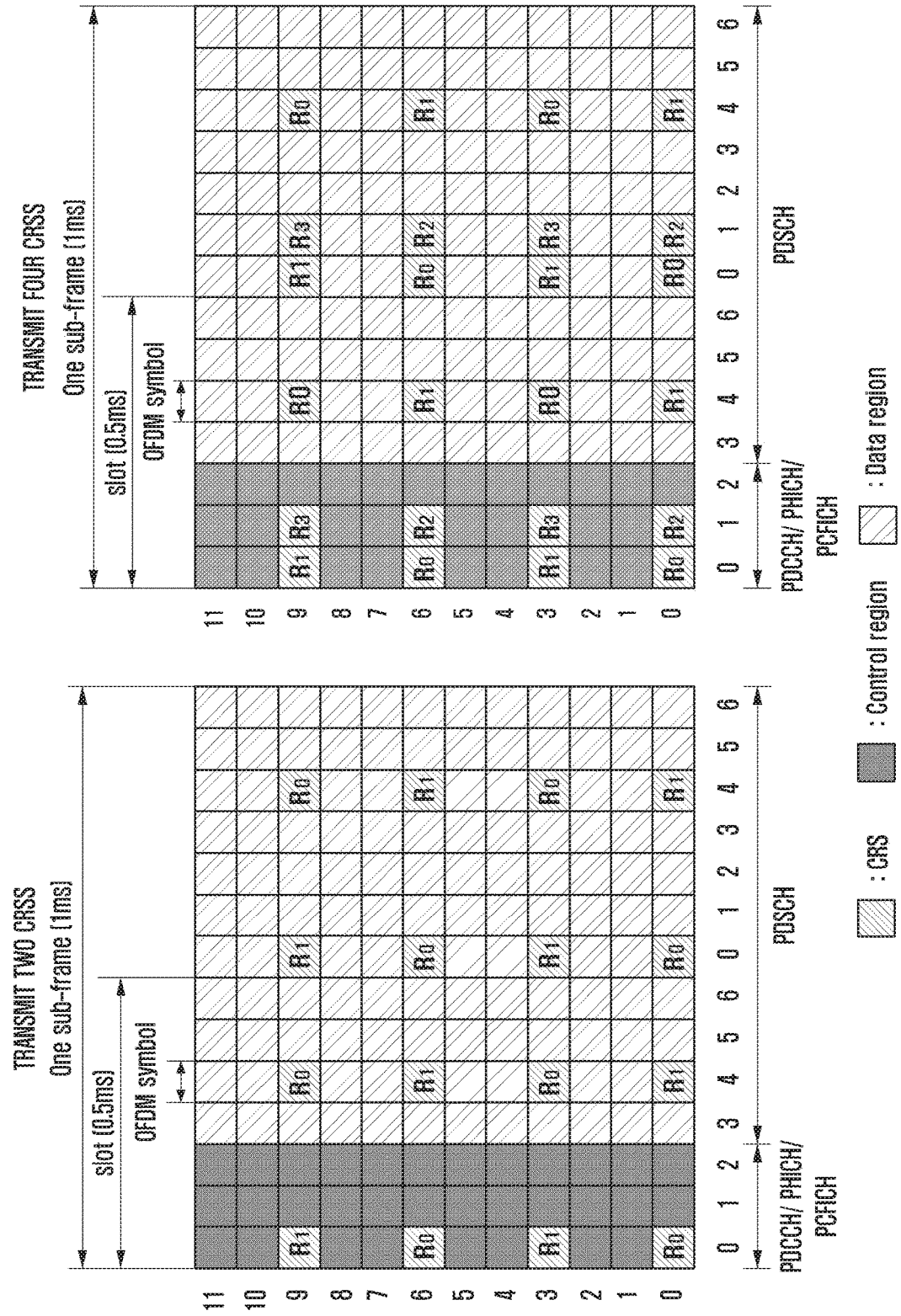
FIG. 1 illustrates the structure of a downlink subframe in LTE.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, a method in which a base station establishes a cell by determining an interference environment of neighboring cells for cell establishment in a wireless communication system and obtaining system information about neighboring cells based on the determined interference environment will be described. In this case, applying different weights in PDSCH detection according to the determined interference environment may be helpful in obtaining the system information.

Determining an interference environment of neighboring cells for cell establishment of a base station according to an embodiment of the disclosure will be described separately according to first to third embodiments.

The disclosure relates to a method for a base station to establish a cell, in which a method for determining an interference environment and a method for detecting a PDSCH are not limited to the embodiments, and may be implemented in various ways.

As the number of mobile data users increases and the amount of data required increases, a method of deploying small cells, picocells, and femtocells using a small base station in one large macrocell has come to be used. By reducing the size of a cell and increasing the number of cells, frequency efficiency may be enhanced, and services for users in a shadow area formed when one base station covers the entire area of a cell may be improved. As the number of cells increases, it is costly to install and operate cells, and thus self-organizing network (SON) technology for autonomously setting parameters suitable for a wireless environment by detecting neighboring cells and identifying information about the neighboring cells and establishing a cell has been proposed. To use this SON technology, a base station estimates the symbol synchronization and cell ID of a neighboring cell through a primary synchronization signal (PSS)/secondary synchronization signal (SSS) transmitted from the neighboring cell even at a low noise power-to-reception power ratio and detects a master information block (MIB) transmitted through a physical broadcasting channel (PBCH) and a system information block (SIB) transmitted through a physical downlink shared channel (PDSCH), thereby identifying a plurality of pieces of system information used in the neighboring cell. The SON base station autonomously establishes a cell thereof using these pieces of information while minimizing the impact of the neighboring cell. Here, the SON base station may accumulate sufficient signals transmitted from a plurality of neighboring base stations, thus detecting information even about a distant base station.

In LTE, each base station always transmits a common reference signal (CRS) except in a specific situation, and may transmit system information or data information by allocating a PDSCH at a specific resource position when it is necessary to transmit the system information or data information to a terminal in a cell thereof. Inter-cell interference occurs where a small cell and a macrocell overlap, for example, on a cell edge, which may deteriorate performance. To solve this problem, techniques for preventing interference from being transmitted through inter-cell cooperation, such as inter-cell interference coordination (ICIC), enhanced ICIC (eICIC), and further eICIC (FeICIC), may be introduced into LTE. These techniques are interference control schemes in which a macro base station empties general data transmission in a specific subframe in order to reduce interference by the macro base station in a neighboring base station. A base station of each cell may exchange information about a transmission resource with a neighboring base station through an X2 message. Base stations that have exchanged information with each other may independently use data resources in transmission to terminals close to each base station because the terminals are distant from an interfering cell, but may allocate data resources so as not to overlap in transmission to terminals in an inter-cell interference area, thus reducing the impact of inter-cell interference. However, a CRS from a neighboring cell is always transmitted, and may thus function as interference. In order to solve this problem, a method of reducing the impact of interference by performing interference cancelation (IC) on a CRS of a neighboring cell or by puncturing received data at a position overlapping that of the CRS of the neighboring cell may be proposed.

In an environment having no information exchange between neighboring cells, each base station may transmit a data signal to a terminal in a cell thereof when needed without considering signal transmission by an adjacent cell. Arbitrary data transmission by each base station may function as interference from the perspective of a receiver. Further, a SON base station may accumulate sufficient signals transmitted from a plurality of base stations and may thus detect information even from a location farther than a cell radius covered by neighboring base stations. Therefore, even though inter-cell cooperation is performed, since each base station independently allocates data resources to terminals at the center of a cell, the SON base station at a distant location may receive not only CRS interference but also data interference. However, when received data is punctured in order to mitigate interference, data information may rather be lost in a low received-SNR environment, such as a SON environment, thus causing deterioration in performance. Therefore, the disclosure proposes a method and an apparatus for use by a base station to establish a cell by determining an interference environment of neighboring cells and employing a suitable interference mitigation scheme in order to detect data even in an environment having no inter-cell cooperation or in a low-SNR area in a SON environment.

FIG. 1 illustrates the structure of a downlink subframe in LTE.

FIG. 1 shows the structure of an LTE downlink subframe with a normal cyclic prefix (CP). One subframe includes two slots, and one slot may have seven OFDM symbols. Channel information is required in order to measure the quality of a channel or detect a received signal. To this end, a base station may transmit a CRS, which is a reference signal known in advance, to a transmitter and a receiver.

As illustrated in FIG. 1, CRSs may transmit up to four ports. In a normal CP, on a time axis, CRS port 0 and 1 may be disposed in the 0th, 4th, 7th, and 11th symbols, and CRS port 2 and 3 may be disposed in 1st and 8th symbols (in an extended CP, CRS port 0 and 1 are disposed in 0th, 3rd, 6th, and 9th symbols, and CRS port 2 and 3 are disposed in 1st and 7th symbols).

In FIG. 1, the case where CRSs transmit two ports is shown on the left, and the case where CRSs transmit four ports is shown on the right. The case where CRSs transmit two ports is illustrated in the following description, which does not exclude the case where CRSs transmit four ports. That is, the disclosure may also be applied to the case where CRSs transmit four ports.

CRSs are disposed at a six-tone interval in the entire band on a frequency axis and may be disposed by shifting on the frequency axis according to $V_{shift}$ (=cell ID mod 6). FIG. 1 is an example where $V_{shift}=0$. The first one to three symbols in a first slot may be allocated for control channels, such as a physical downlink control channel (PDCCH), a physical hybrid automatic repeat request indicator channel (PHICH), and a physical control format indicator channel (PCFICH), in order to transmit control information, and subsequent symbols may be allocated for a PDSCH for transmitting data.

Figure 2:
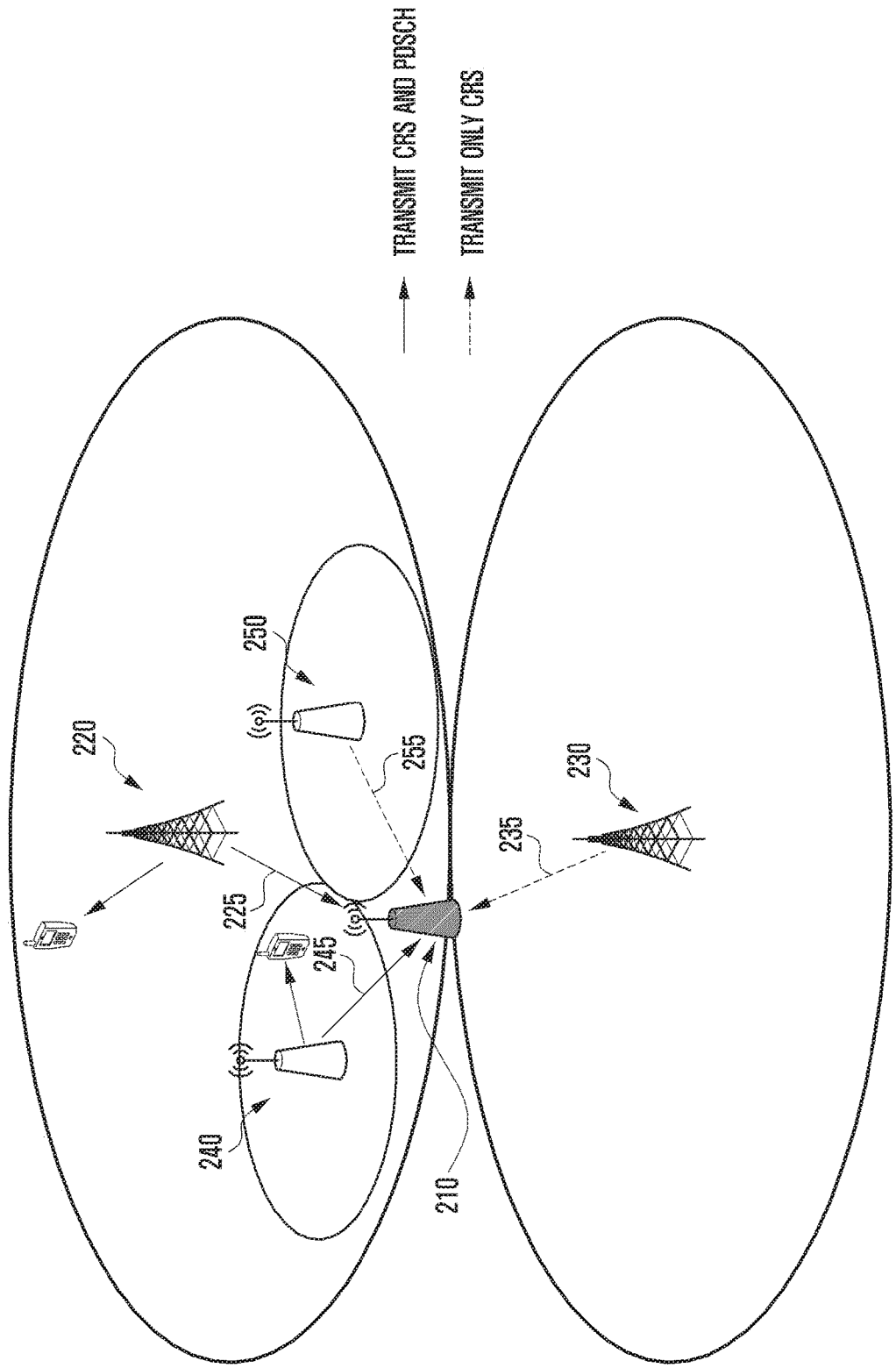
FIG. 2 illustrates an example of interference that occurs when a signal of a neighboring cell is detected in a SON environment.

FIG. 2 illustrates an example of interference that occurs when a signal of a neighboring cell is detected in a SON environment.

FIG. 2 shows the configuration of an illustrative wireless communication network in which the disclosure may be implemented. The embodiment illustrated in FIG. 2 is only for describing the disclosure, and does not limit the scope of the disclosure.

When an additional small base station 210 is installed in an environment in which macrocells 220 and 230 and small cells 240 and 250 operate, the small base station 210 may detect a signal and a channel in order to configure a SON. The small base station 210 may detect the cell IDs and symbol boundaries of neighboring cells through PSSs/SSSs transmitted from the neighboring cells to identify system information used in the neighboring cells, and may detect an MIB transmitted through a PBCH to obtain the number of CRS ports, superframe information, and bandwidth information used in the neighboring cells.

Further, the small base station 210 may detect an SIB transmitted through a PDSCH to obtain the system information used in the neighboring cells. However, since other neighboring base stations always transmit a CRS, except in a specific situation when the SIB transmitted through the PDSCH is detected, and allocate a PDSCH when transmitting data to a terminal in each cell, if a resource for the CRS or PDSCH overlaps that for the SIB, the CRS or PDSCH may function as interference.

Therefore, if the SON base station 210 processes interference by distinguishing whether interference coming from a neighboring cell is an environment in which only the position of a resource for transmitting the CRS overlaps or an environment in which the position of a resource for transmitting the PDSCH overlaps, thereby Interference effects can be mitigated.

In addition, since the position of a resource for transmitting a CRS changes according to the cell ID, the position at which interference is received from a CRS transmitted by neighboring cells may vary. A base station may distinguish between an interference environment in which the position of a resource for transmitting a CRS of a cell (hereinafter, "serving cell") from which the base station desires to detect a signal overlaps the position of a resource for transmitting a CRS of neighboring cells (hereinafter, "interfering cells"), which may serve as interference in signal detection by the base station, and an interference environment in which the position of a resource for transmitting a CRS of a serving cell does not overlap the position of a resource for transmitting a CRS of an interfering cell.

For example, it may be assumed that the base station 210 obtains system information from any one of the neighboring cells. The base station 210 may detect a signal 225 from the macrocell 220. Here, among the neighboring cells, the macrocell 220 may be a serving cell, and the remaining cells 230, 240, and 250 may be interfering cells. In addition, signals 235, 245, and 255 transmitted from the remaining cells may be interference signals.

In FIG. 2, there may two types of signals that neighboring cells transmit to the base station 210. One is a signal 225 and 245 including a CRS and a PDSCH, and the other is a signal 235 and 255 including only a CRS.

Hereinafter, a 'CRS-overlapping interference environment' may be an interference environment in which the position of a resource for transmitting a CRS of an interfering cell overlaps the position of a resource for transmitting a CRS of a serving cell. A 'CRS-nonoverlapping interference environment' may be an interference environment in which the position of a resource for transmitting a CRS of an interfering cell does not overlap the position of a resource for transmitting a CRS of a serving cell but overlaps the position of a resource for transmitting a PDSCH of the serving cell. A 'PDSCH interference environment' may be an interference environment in which the position of a resource for transmitting a PDSCH of a serving cell overlaps the position of a resource for transmitting a PDSCH of an interfering cell.

'CRS interference' may refer to the case where the position of a resource for transmitting a CRS of an interfering cell overlaps the position of a resource for transmitting a signal of a serving cell, whereby the CRS acts as interference. 'PDSCH interference' may refer to the case where the position of a resource for transmitting a PDSCH of an interfering cell overlaps the position of a resource for transmitting a signal of a serving cell, whereby the PDSCH acts as interference.

Figure 3:
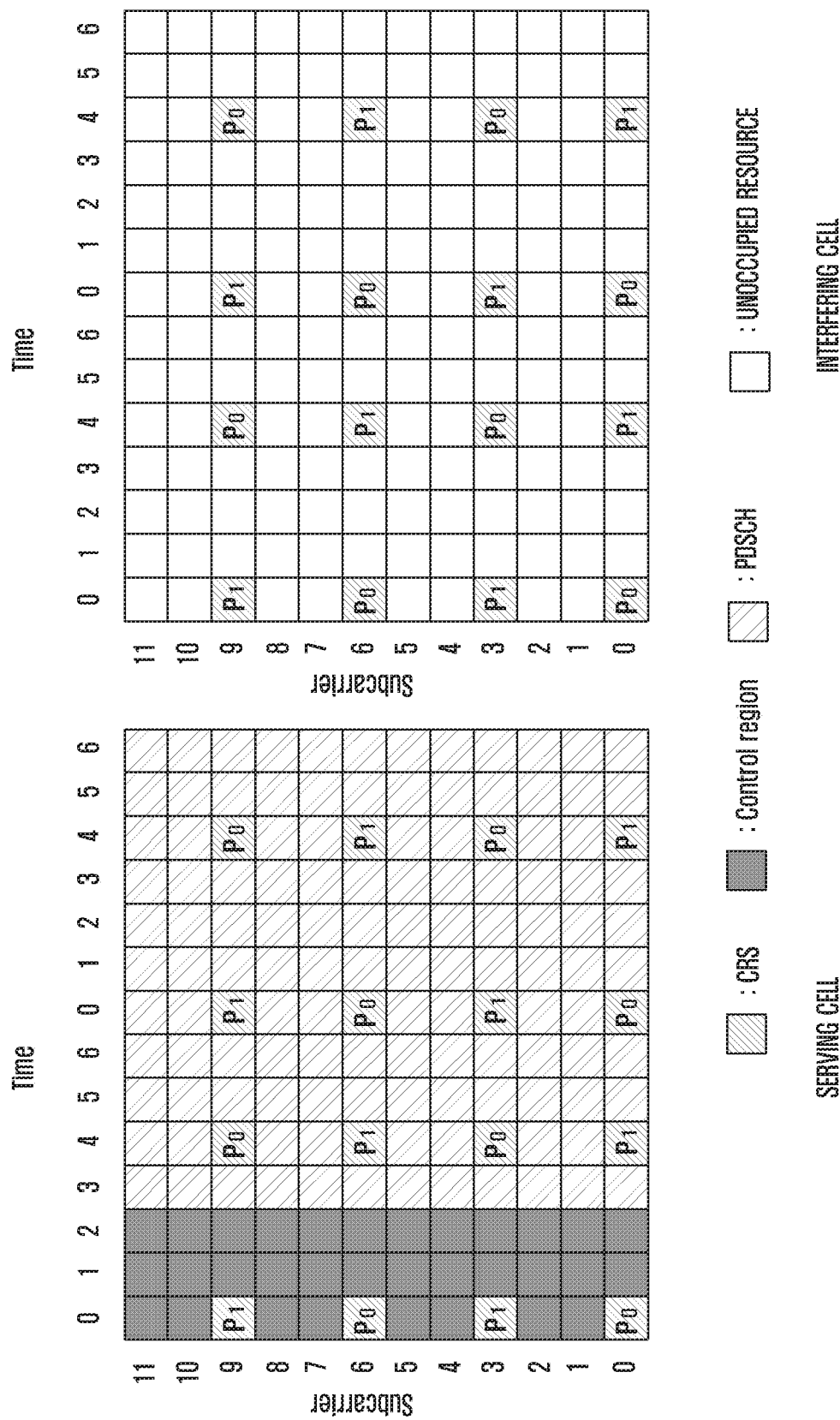
FIG. 3 is a diagram illustrating a resource element (RE) in the case where only a resource for transmitting a CRS of a serving cell and a resource for transmitting a CRS of an interfering cell overlap.

FIG. 3 is a diagram illustrating a resource element (RE) in an environment where only CRS-overlapping interference occurs.

Specifically, the diagram illustrates REs in the case where an interfering cell transmits only a CRS and the position of a resource for the CRS transmitted by the interfering cell overlaps the position of a resource for a CRS transmitted by a serving cell.

For example, in FIG. 2, when detecting the signal 225 from the neighboring cell 220, the base station 210 may receive interference from the signal 255 transmitted from the small cell 250. In this example, it may be assumed that the position of a resource for transmitting a CRS of a serving cell overlaps the position of a resource for transmitting a CRS of an interfering cell.

Neighboring base stations may have different cell IDs but may transmit a CRS at the same resource position. That is, the position of a resource for transmitting a CRS of an interfering cell overlaps the position of a resource for transmitting a CRS of a serving cell, while an RE for transmitting a PDSCH of the serving cell encounters no interference from the interfering cell. A signal detected from the serving cell is represented by the following equation.

$$y_k = H_{0,k}s_{0,k} + H_{1,k}s_{1,k} + n_k, \ k \in \text{CRS position} \quad \text{Equation 1}$$

$$y_k = H_{0,k}x_{0,k} + n_k, \ k \in \text{PDSCH position} \quad \text{Equation 2}$$

Here, $H_{u,k}$ is a channel for a uth base station at a kth tone, $s_{u,k}$ is a CRS transmitted to the uth base station on the kth tone, $x_{u,k}$ is a PDSCH signal transmitted to the uth base station on the kth tone, and $n_k$ is a noise signal on the kth tone.

As shown in Equation 1 and Equation 2, the power and the phase of interference at the position of the resource for transmitting the CRS do not match those of interference at the position of the resource for transmitting the PDSCH.

Figure 4:
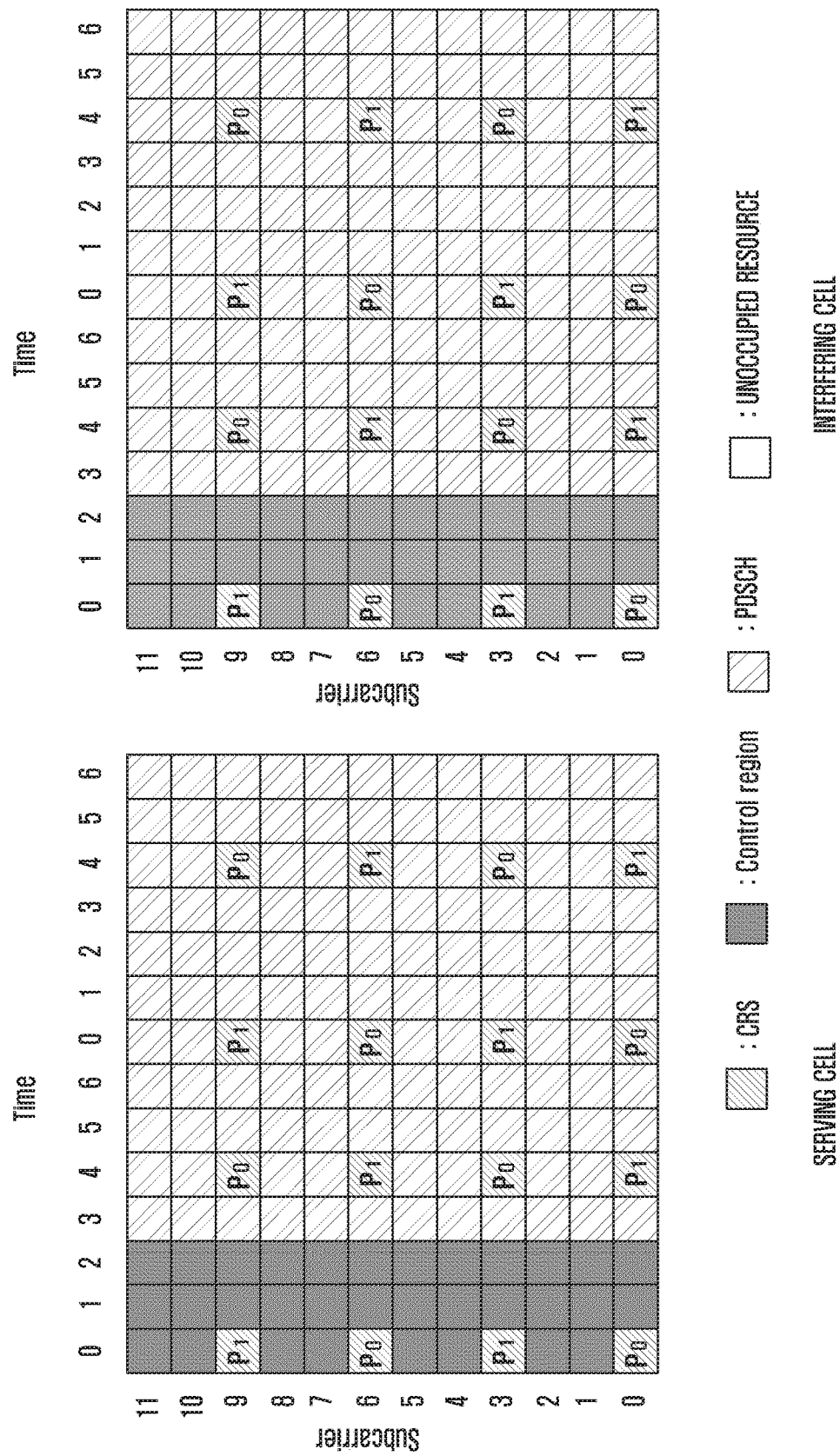
FIG. 4 is a diagram illustrating an RE in the case where a resource for transmitting a CRS of a serving cell and a resource for transmitting a CRS of an interfering cell overlap and a resource for transmitting a PDSCH of the serving cell and a resource for transmitting a PDSCH of the interfering cell overlap.

FIG. 4 is a diagram illustrating the case where PDSCH interference also occurs in a CRS-overlapping interference environment.

Specifically, the diagram illustrates REs in the case where a resource for transmitting a CRS of a serving cell and a resource for transmitting a CRS of an interfering cell overlap and a resource for transmitting a PDSCH of the serving cell and a resource for transmitting a PDSCH of the interfering cell overlap.

For example, in FIG. 2, when detecting the signal 225 from the neighboring cell 220, the base station 210 may receive interference from the signal 245 transmitted from the small cell 240. In this example, it may be assumed that the position of a resource for transmitting a CRS of a serving cell overlaps the position of a resource for transmitting a CRS of an interfering cell.

The position of a resource for transmitting a CRS of an interfering cell may overlap the position of a resource for transmitting a CRS of a serving cell, and the position of a resource for transmitting a PDSCH of the interfering cell may overlap the position of a resource for transmitting a PDSCH of the serving cell. A signal detected from the serving cell is represented by the following equation.

$$y_k = H_{0,k}s_{0,k} + H_{1,k}s_{1,k} + n_k, \ k \in \text{CRS position} \quad \text{Equation 3}$$

$$y_k = H_{0,k}x_{0,k} + H_{1,k}x_{1,k} + n_k, \ k \in \text{PDSCH position} \quad \text{Equation 4}$$

As shown in Equation 3 and Equation 4, when PDSCH interference also occurs in a CRS-overlapping interference environment, similar levels of interference occur at the position of the resource for transmitting the CRS and at the position of the resource for transmitting the PDSCH excluding the difference in power between the CRS and the PDSCH of the interfering cell.

Figure 5:
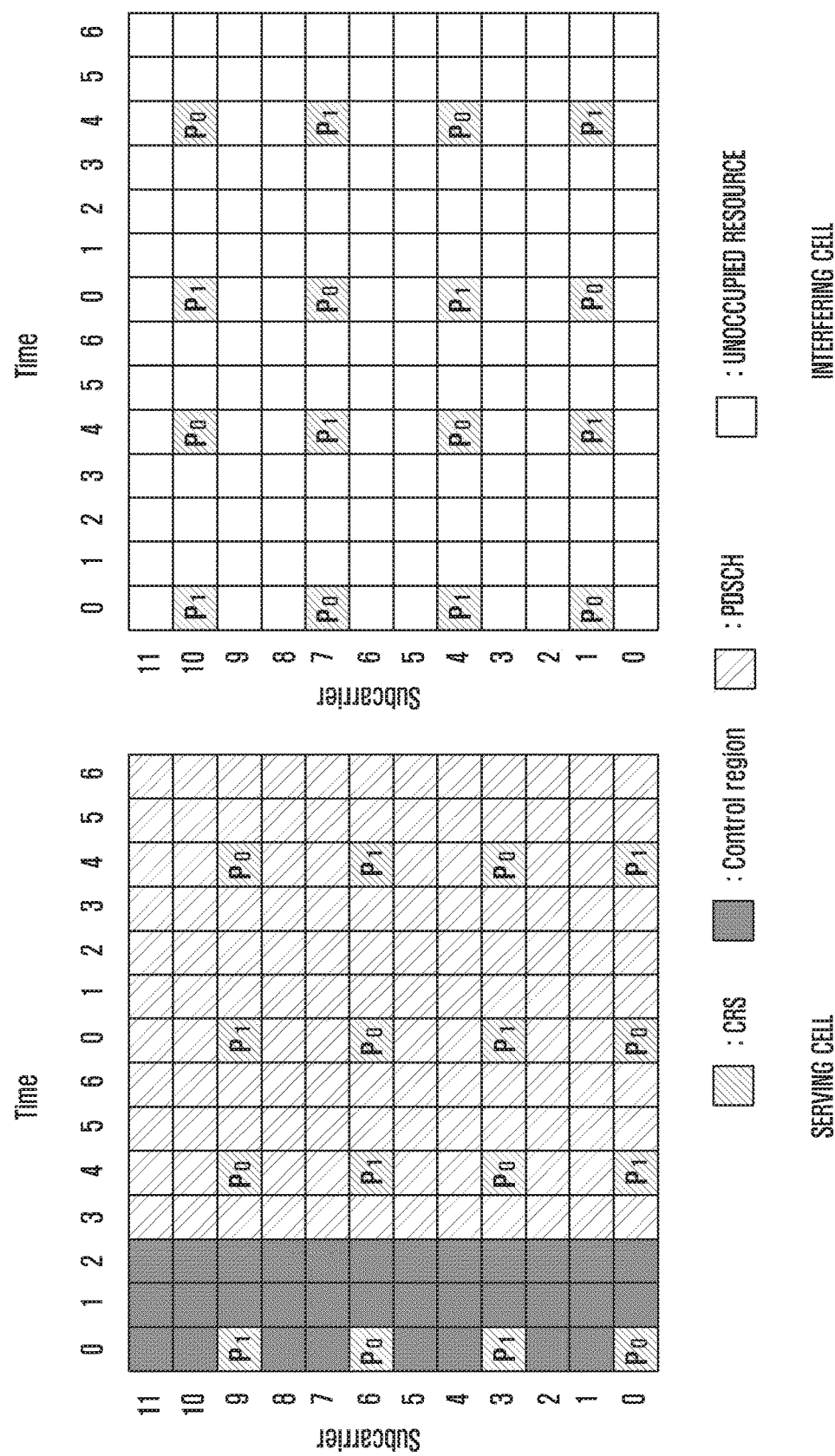
FIG. 5 is a diagram illustrating an RE in the case where a resource for transmitting a CRS of a serving cell and a resource for transmitting a CRS of an interfering cell do not overlap and a resource for transmitting a PDSCH of the serving cell and a resource for transmitting a CRS of the interfering cell overlap.

FIG. 5 is a diagram illustrating an RE in the occurrence of only a CRS-nonoverlapping interference environment.

Specifically, the diagram illustrates REs in the case where a resource for transmitting a CRS of a serving cell and a resource for transmitting a CRS of an interfering cell do not overlap and a resource for transmitting a PDSCH of the serving cell and a resource for transmitting a CRS of the interfering cell overlap.

For example, in FIG. 2, when detecting the signal 225 from the neighboring cell 220, the base station 210 may receive interference from the signal 235 transmitted from the macrocell 230. In this example, it may be assumed that the position of a resource for transmitting a CRS of a serving cell does not overlap the position of a resource for transmitting a CRS of an interfering cell.

When a CRS of a serving cell and a CRS of an interfering cell have different $v_{shift}$ (=cell ID mod 6) values, the positions of resources for transmitting the CRSs may be different. In addition, the position of the resource for transmitting the CRS of the interfering cell may overlap the position of a resource for transmitting some PDSCHs of the serving cell. A signal detected from the serving cell is represented by the following equation.

$$y_k = H_{0,k}s_{0,k} + n_k, \ k \in \text{CRS position} \qquad \text{Equation 5}$$

$$y_k = H_{0,k}x_{0,k} + H_{1,k}s_{1,k} + n_k, \ k \in \text{PDSCH position receiving CRS interference} \qquad \text{Equation 6}$$

$$y_k = H_{0,k}x_{0,k} + n_k, \ k \in \text{other PDSCH positions} \qquad \text{Equation 7}$$

As shown in Equation 6 and Equation 7, when only CRS interference occurs in a CRS-nonoverlapping interference environment, a PDSCH detection region may be divided into two regions. The base station may apply separate interference mitigation schemes suitable for the two regions.

In a region where the position of the resource for transmitting the CRS of the interfering cell and the position of the resource for transmitting the PDSCH of the serving cell overlap, a measured SNR value, obtained by adding interference channel power to an SNR measured at the position of the resource for transmitting the CRS of the serving cell, may be applied.

In a region where other PDSCHs are detected, since similar levels of interference occur at the position of the resource for transmitting the CRS and at the position of the resource for transmitting the PDSCH, a statistical value measured at the position of the resource for transmitting the CRS may be applied when detecting the PDSCH.

Figure 6:
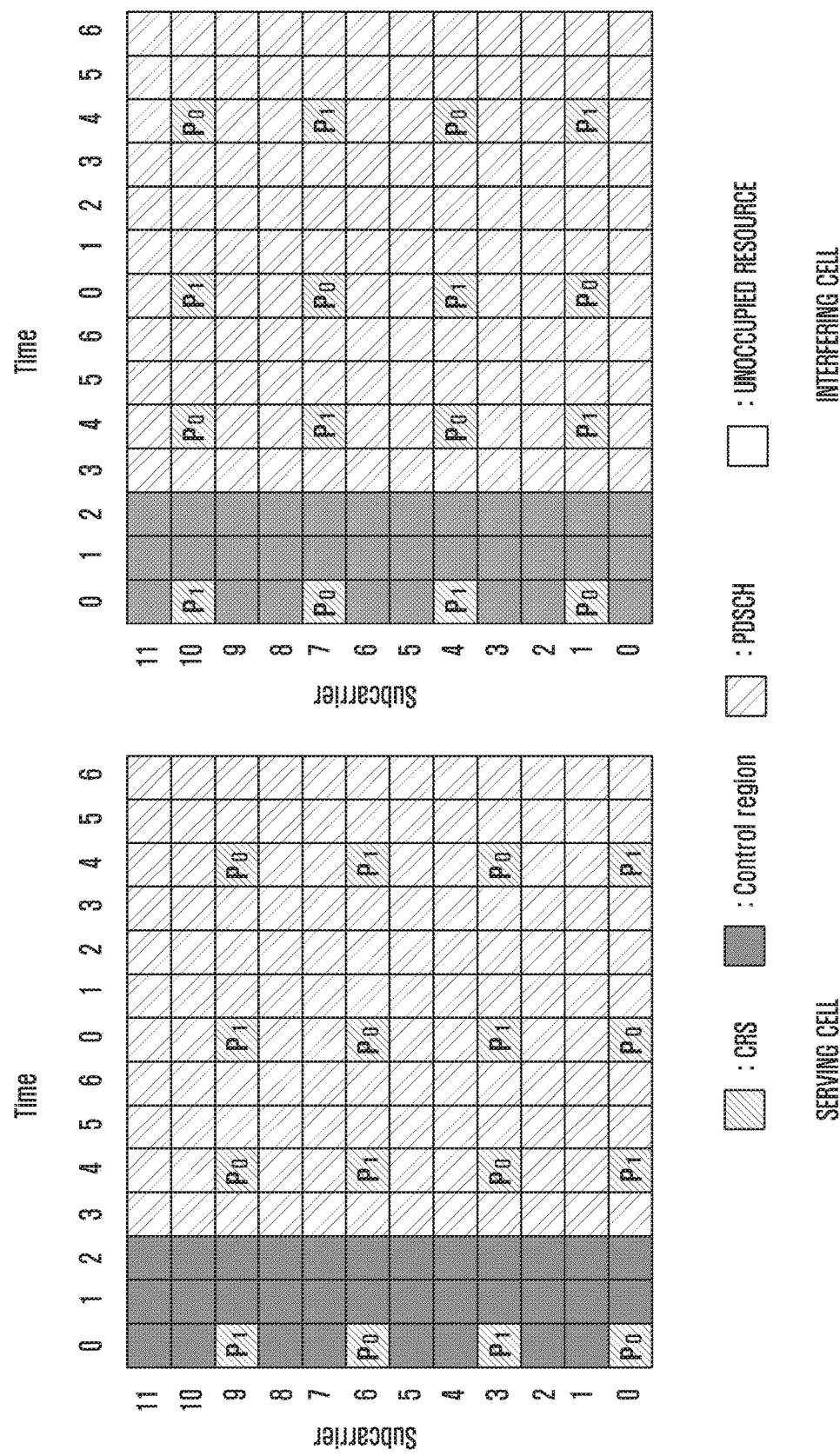
FIG. 6 is a diagram illustrating an RE in the case where a resource for transmitting a CRS of a serving cell and a resource for transmitting a CRS of an interfering cell do not overlap and a resource for transmitting a PDSCH of the serving cell overlap the resource for transmitting the CRS of the interfering cell and a resource for transmitting a PDSCH of the interfering cell.

FIG. 6 is a diagram illustrating the case where PDSCH interference also occurs in a CRS-nonoverlapping interference environment.

Specifically, the diagram illustrates REs in the case where a resource for transmitting a CRS of a serving cell and a resource for transmitting a CRS of an interfering cell do not overlap and resources for transmitting a PDSCH of the serving cell overlap the resource for transmitting the CRS of the interfering cell and a resource for transmitting a PDSCH of the interfering cell.

For example, in FIG. 2, when detecting the signal 225 from the neighboring cell 220, the base station 210 may receive interference from the signal 245 transmitted from the small cell 240. In this example, it may be assumed that the position of a resource for transmitting a CRS of a serving cell does not overlap the position of a resource for transmitting a CRS of an interfering cell.

When the base station detects a signal received from the serving cell, both CRS interference and PDSCH interference may occur from the interfering cell. Accordingly, a detection region may be divided according to the position of a resource in which the base station detects a PDSCH of the serving cell. The signal detected from the serving cell is represented by the following equation.

$$y_k = H_{0,k}s_{0,k} + H_{1,k}x_{1,k} + n_k, \ k \in \text{CRS position} \qquad \text{Equation 8}$$

$$y_k = H_{0,k}x_{0,k} + H_{1,k}s_{1,k} + n_k, \ k \in \text{PDSCH position receiving CRS interference} \qquad \text{Equation 9}$$

$$y_k = H_{0,k}x_{0,k} + H_{1,k}x_{1,k} + n_k, \ k \in \text{other PDSCH positions} \qquad \text{Equation 10}$$

As shown in Equation 9 and Equation 10, when both CRS interference and PDSCH interference occur in a CRS-nonoverlapping interference environment, a PDSCH detection region may be divided into two regions.

Further, as shown in Equation 8 and Equation 10, similar levels of interference occur at the position of the resource for transmitting the PDSCH of the serving cell, where CRS interference of the interfering cell does not occur, and at the position of the resource for transmitting the CRS. Therefore, a measured SNR calculated at the position of the resource for transmitting the CRS may be applied when the base station detects the PDSCH.

Figure 7:
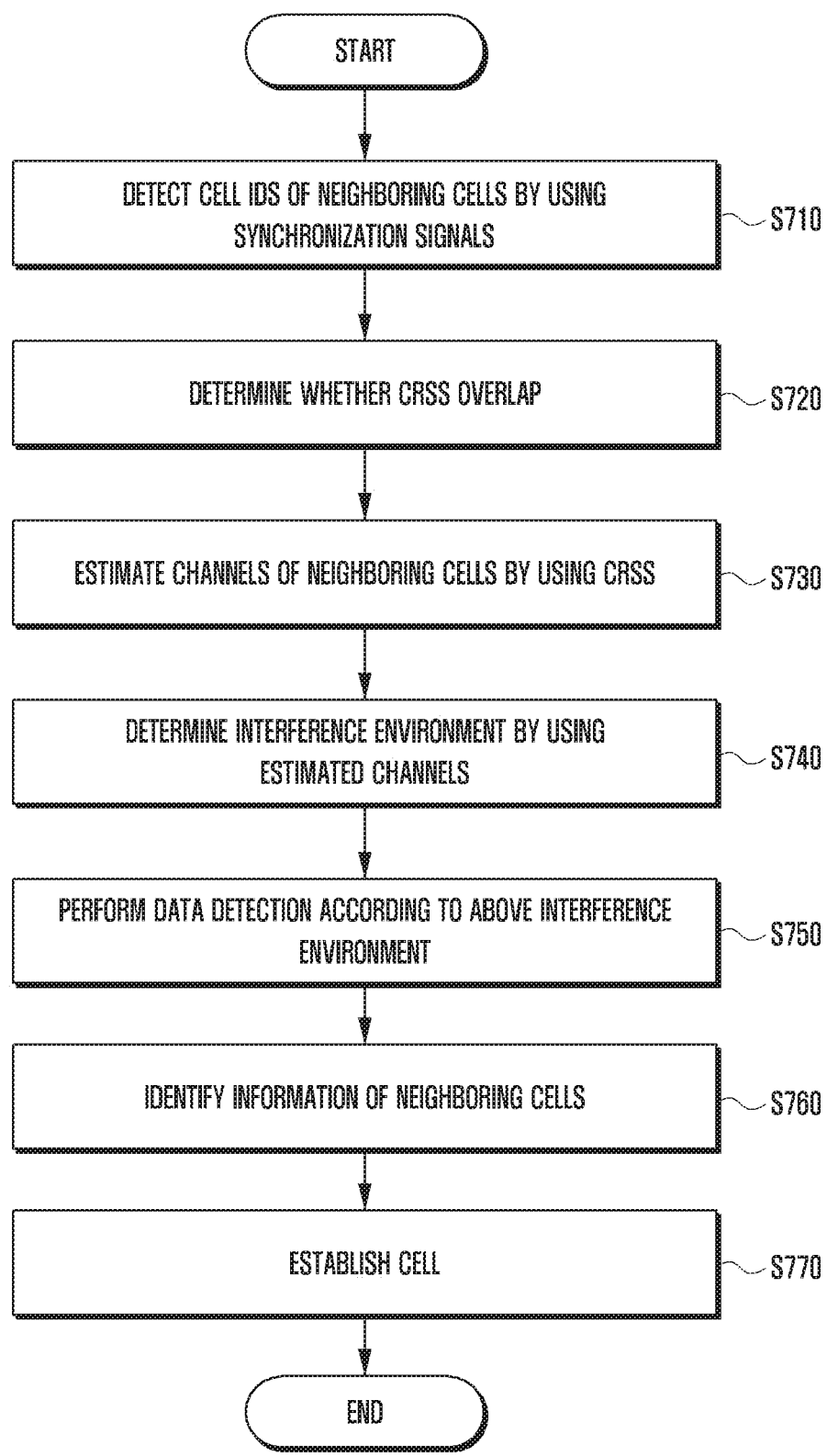
FIG. 7 is a flowchart illustrating a method for a base station to establish a cell according to an embodiment of the disclosure.

FIG. 7 is a flowchart illustrating a method for use by a base station to establish a cell according to an embodiment of the disclosure.

Operations according to the disclosure are briefly described as follows. First, the base station may detect a cell ID using a synchronization signal of neighboring cells. The base station may determine, using the cell ID, whether a serving cell and interfering cells are in a CRS-overlapping interference environment or in a CRS-nonoverlapping interference environment. The base station may estimate the channel of the cells using a CRS of the neighboring cells. The base station may determine the interference environment of the neighboring cells using the estimated channel. The base station may perform data detection according to the determined interference environment and may obtain system information of the neighboring cells. The base station may establish a cell using the obtained information.

Each operation in FIG. 7 is not necessarily an essential operation, and some operations may be omitted. The operations of the disclosure will be described in detail with reference to FIG. 7.

First, prior to operation S710, the base station may obtain system information of neighboring cells in order to establish a cell. The base station may distinguish between a serving cell from which a signal is detected among a plurality of neighboring cells and an interfering cell that may act as interference in detecting the signal transmitted from the serving cell.

In operation S710, the base station may detect the frame synchronization and cell ID of the neighboring cells using a PSS and an SSS. Here, the base station detects a signal by accumulating sufficient signals of the neighboring cells, and can thus find the frame synchronization and the cell ID even with a small signal of a distant neighboring-cell base station.

In operation S720, the base station may determine whether the positions of resources for transmitting CRSs of the neighboring cells overlap. The base station may compare remainders obtained by dividing the cell ID detected in operation S710 by a previously input value, thereby identifying whether the resources for transmitting the CRSs overlap.

In the disclosure, the input value may be assumed to be 6. In this case, the base station may identify the CRS position of the neighboring cells through $v_{shift}$ (=cell ID mod 6) using the cell ID and may determine whether the positions of the resources for transmitting the CRSs of the neighboring cells overlap.

In operation S730, the base station may estimate the channel of the neighboring cells using the CRSs. When the positions of the resources for transmitting the CRSs of the neighboring cells overlap, the base station may improve channel estimation performance through interference cancellation (IC).

When performing the IC, the base station may utilize techniques for preventing interference from being transmitted through inter-cell cooperation, such as inter-cell interference coordination (ICIC), enhanced ICIC (eICIC), and further eICIC (FeICIC).

In operation S740, the base station may determine an interference environment of the neighboring cells using the channel estimation. A method by which the base station determines the interference environment is described in detail below with reference to FIG. 8, FIG. 9, and FIG. 10.

In operation S750, the base station may perform data detection according to the determined interference environment of the neighboring cells. The base station needs to detect an SIB in order to establish a cell and may thus detect a PDSCH transmitting the SIB.

When it is determined whether PDSCH interference occurs in the position of a resource for transmitting the PDSCH of the serving cell according to the interference environment determined in operation S740, the base station may differently apply a statistical characteristic, measured at the position of a resource for a CRS transmitted when detecting the PDSCH of the serving cell, according to each interference environment.

Various methods may be used to detect the PDSCH. Illustrated below are examples of methods that can be used for PDSCH detection according to the interference environment.

First, a minimum mean square error (MMSE) method is a method for calculating and using only interference power and noise power. An interference rejection combining (IRC) method is a method for mitigating the impact of interference by utilizing covariance statistical characteristics when there are a large number of receiving antennas. Interference cancellation (IC) is a method for directly eliminating interference using an estimated interference channel.

Figure 11:
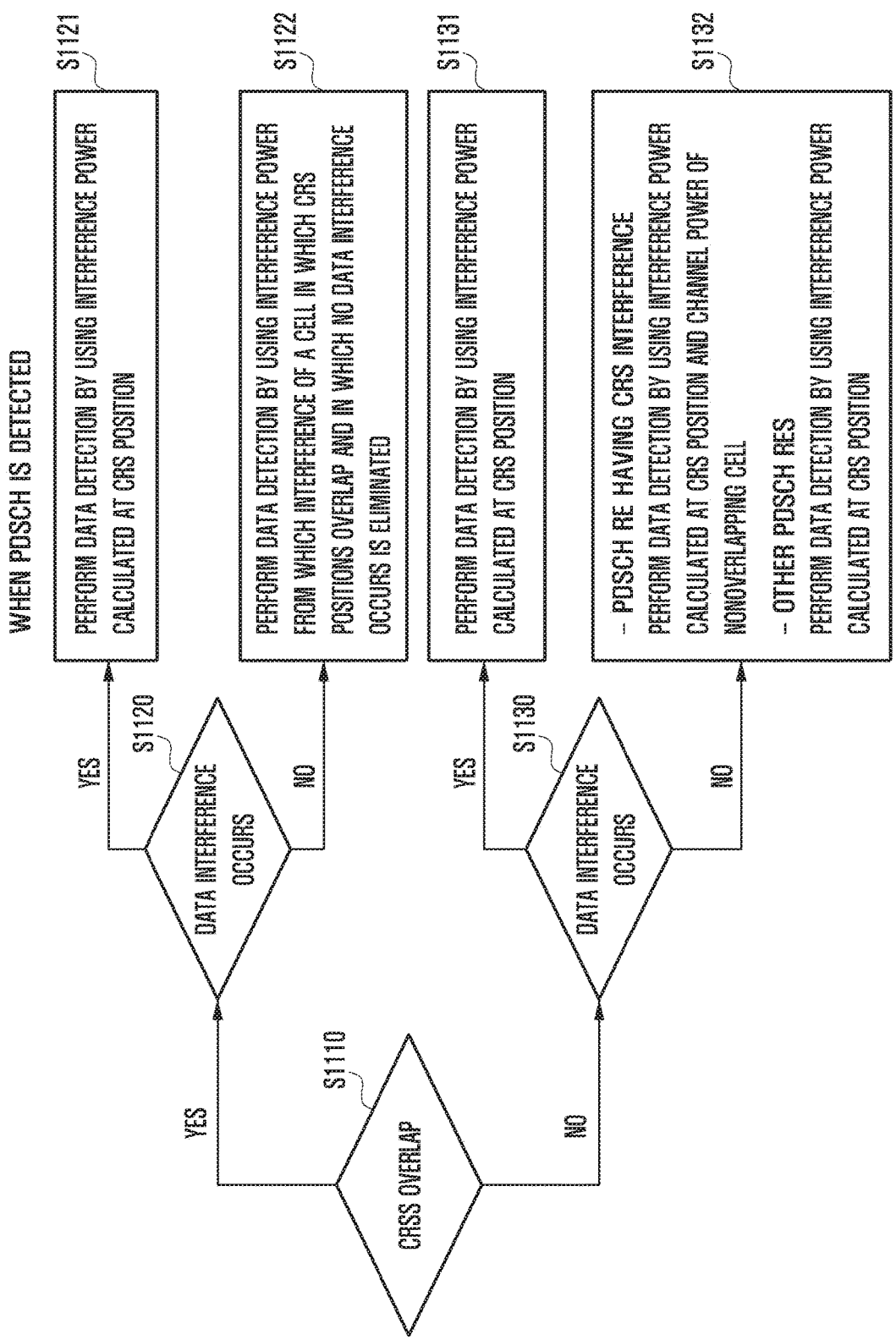
FIG. 11 illustrates a method of applying an MMSE weight according to an interference environment determined according to embodiments of the disclosure.

As an example of the above methods, a method using the MMSE method will be described in detail below with reference to FIG. 11. The following description of FIG. 11 is only an example for explaining the disclosure and does not limit the scope of the disclosure, and the disclosure may be applied to all of the above detection methods.

Figure 8:
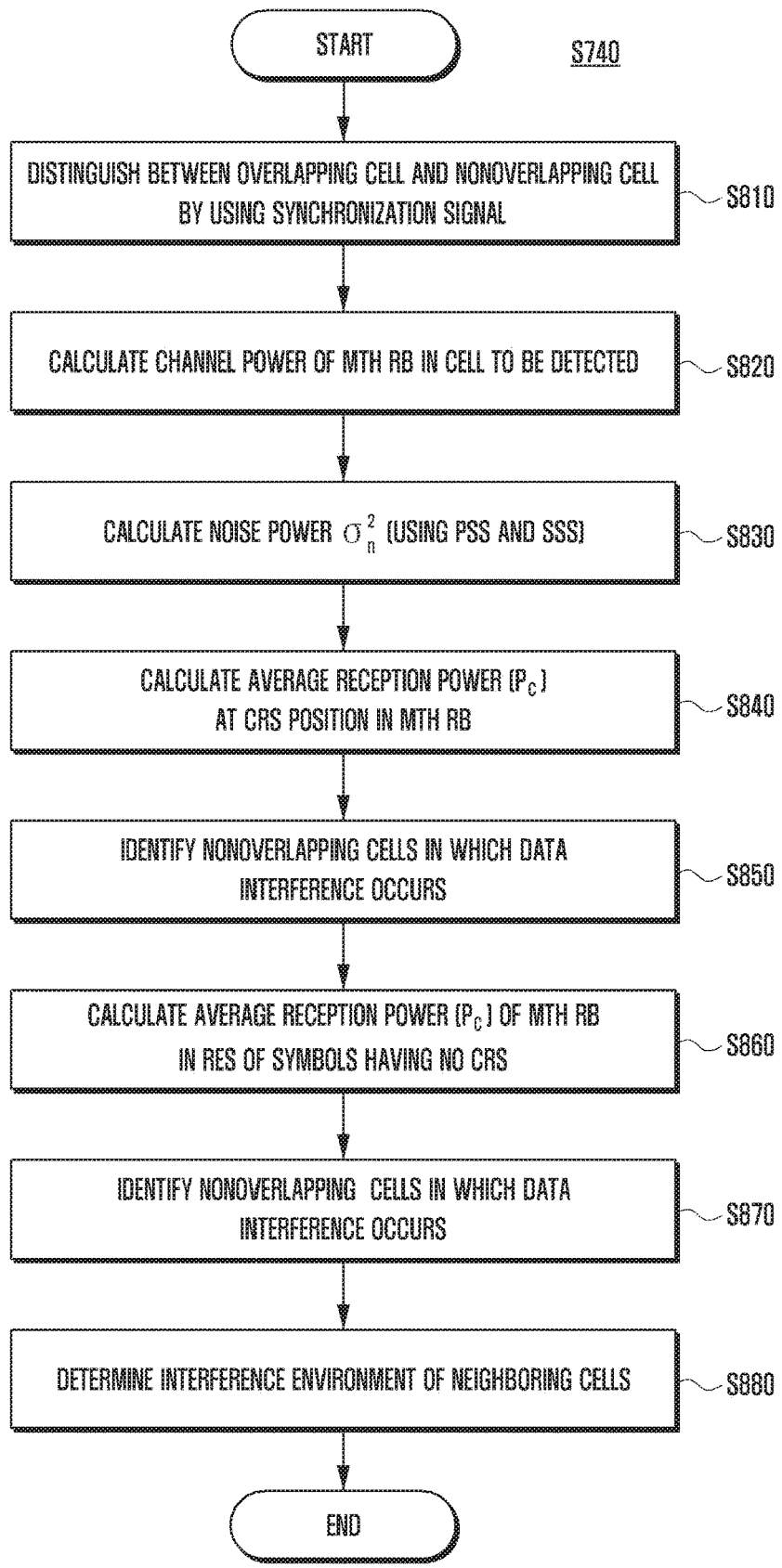
FIG. 8 is a flowchart illustrating a method for determining an interference environment of neighboring cells according to a first embodiment of the disclosure.

FIG. 8 is a flowchart illustrating a method for determining an interference environment of neighboring cells according to a first embodiment of the disclosure.

The method for determining the interference environment of the neighboring cells according to the first embodiment of the disclosure is briefly described as follows. A base station may identify cells in which data interference occurs among nonoverlapping cells in which the position of a resource for transmitting a CRS of a serving cell and the position of a resource for transmitting a CRS of an interfering cell do not overlap (hereinafter, referred to as 'CRS-nonoverlapping cells'). Further, the base station may identify cells in which data interference occurs among overlapping cells in which the position of the resource for transmitting the CRS of the serving cell and the position of the resource for transmitting the CRS of the interfering cell overlap (hereinafter referred to as 'CRS-overlapping cells'), and may determine an interference environment of neighboring cells.

Operations according to the first embodiment of the disclosure are described in detail below with reference to FIG. 8.

First, in operation S810, the base station may distinguish between a CRS-overlapping cell and a CRS-nonoverlapping cell using a synchronization signal. Through operation S710 and operation S720, the base station may divide neighboring cells into a CRS-overlapping cell and a CRS-nonoverlapping cell as follows.

CRS-overlapping cell: $C_{OL} = \{c_{OL,j} \text{ for } j=1, 2, \ldots, N_{OL}\}$,     Equation 11

CRS-nonoverlapping cell: $C_{NOL} = \{c_{NOL,j} \text{ for } j=1, 2, \ldots, N_{NOL}\}$     Equation 12

The respective power sets of the above two sets may be defined as $M_{OL}$ and $M_{NOL}$. $M_{OL,j}$ and $M_{NOL,j}$ may denote jth subsets of the power sets $M_{OL}$ and $M_{NOL}$, respectively.

In operation S820, the base station may calculate the channel power ($S_{i,m}$) of an $m^{th}$ RB in allocated RBs of an ith cell to be detected by the base station. The channel power is calculated using the following equation.

$$S_i = \frac{1}{N_C} \sum_k |\hat{H}_{i,k}|^2 \quad \text{Equation 13}$$

Here, $N_C$ may denote the number of resources for transmitting a CRS in the $m^{th}$ RB.

In operation S830, the base station may calculate noise power. The noise power may be calculated by a plurality of methods. For example, the base station may calculate noise power by eliminating all CRSs overlapping at the position of a resource for transmitting a CRS, or may calculate noise power ($\sigma_n^2$) by accumulating the power of ten emptied REs among 72 REs allocated in the regions of a primary synchronization signal (PSS) and a secondary synchronization signal (SSS) or by determining the emptied RBs.

In operation S840, the base station may calculate an average reception power value ($P_C$) measured at the position of a resource for transmitting the CRS in the $m^{th}$ RB. The average reception power ($P_C$) is calculated using the following equation.

$$P_c = \frac{1}{N_c} \sum_k |y_k|^2 \text{ for } k \in CRS \text{ position in } mth \ RB \quad \text{Equation 14}$$

In operation S850, the base station may identify cells in which data interference occurs among the CRS-nonoverlapping cells. The base station may use the average reception power ($P_C$), the channel power, the noise power, and the channel power of the CRS-overlapping cells. The cells in which data interference occurs in a CRS-nonoverlapping environment may be identified using the following equation.

$$\hat{C}_{NOL,D} = \arg_{M_{NOL,j}} \min \left| P_C - S_i - \sum_{k \in C_{OL}} S_k - \sum_{j' \in M_{NOL,j}} S_{j'} - \sigma_n^2 \right| \quad \text{Equation 15}$$

Equation 15 may be satisfied by a set of cells in which data interference occurs among the CRS-nonoverlapping cells. The set of the cells may correspond to the interference environment described in connection with FIG. 6. Therefore, cells other than the cells in which data interference occurs among the CRS-nonoverlapping cells may correspond to the interference environment described in connection with FIG. 5.

In operation S860, the base station may calculate the average reception power ($P_D$) of the $m^{th}$ RB in REs of symbols having no CRS. The average reception power ($P_D$) is calculated using the following equation.

$$P_D = \frac{1}{N_D} \sum_k |y_k|^2 \text{ for } k \in PDSCH \text{ position of } mth \text{ RB \& non-}CRS \text{ symbol} \qquad \text{Equation 16}$$

In Equation 16, $N_D$ may denote the number of resources on which no CRS is transmitted in the $m^{th}$ RB.

In operation S870, the base station may identify cells in which data interference occurs among the CRS-overlapping cells. The base station may use the average reception power ($P_D$), the channel power, the noise power, and the channel power of the cells ($\hat{C}_{NOL,D}$) in which data interference occurs among the CRS-nonoverlapping cells, which can be identified in operation S850. The cells in which data interference occurs in a CRS-overlapping environment may be identified using the following equation.

$$\hat{C}_{OL,D} = \arg_{M_{OL,j}} \min \left| P_D - S_i - \sum_{k \in \hat{C}_{NOL,D}} S_k - \sum_{j' \in M_{OL,j}} S_{j'} - \sigma_n^2 \right| \qquad \text{Equation 17}$$

Equation 17 may be satisfied by a set of cells in which data interference occurs among the CRS-overlapping cells. The set of the cells may correspond to the interference environment described in connection with FIG. 4. Therefore, cells other than the cells in which data interference occurs among the CRS-overlapping cells may correspond to the interference environment described in connection with FIG. 3.

In operation S880, the base station may determine an interference environment of the neighboring cells using the results of operation S850 and operation S870. The base station may determine that, for the serving cell, the interfering cells correspond to one of the interference environments described in connection with FIG. 3 to FIG. 6.

Figure 9:
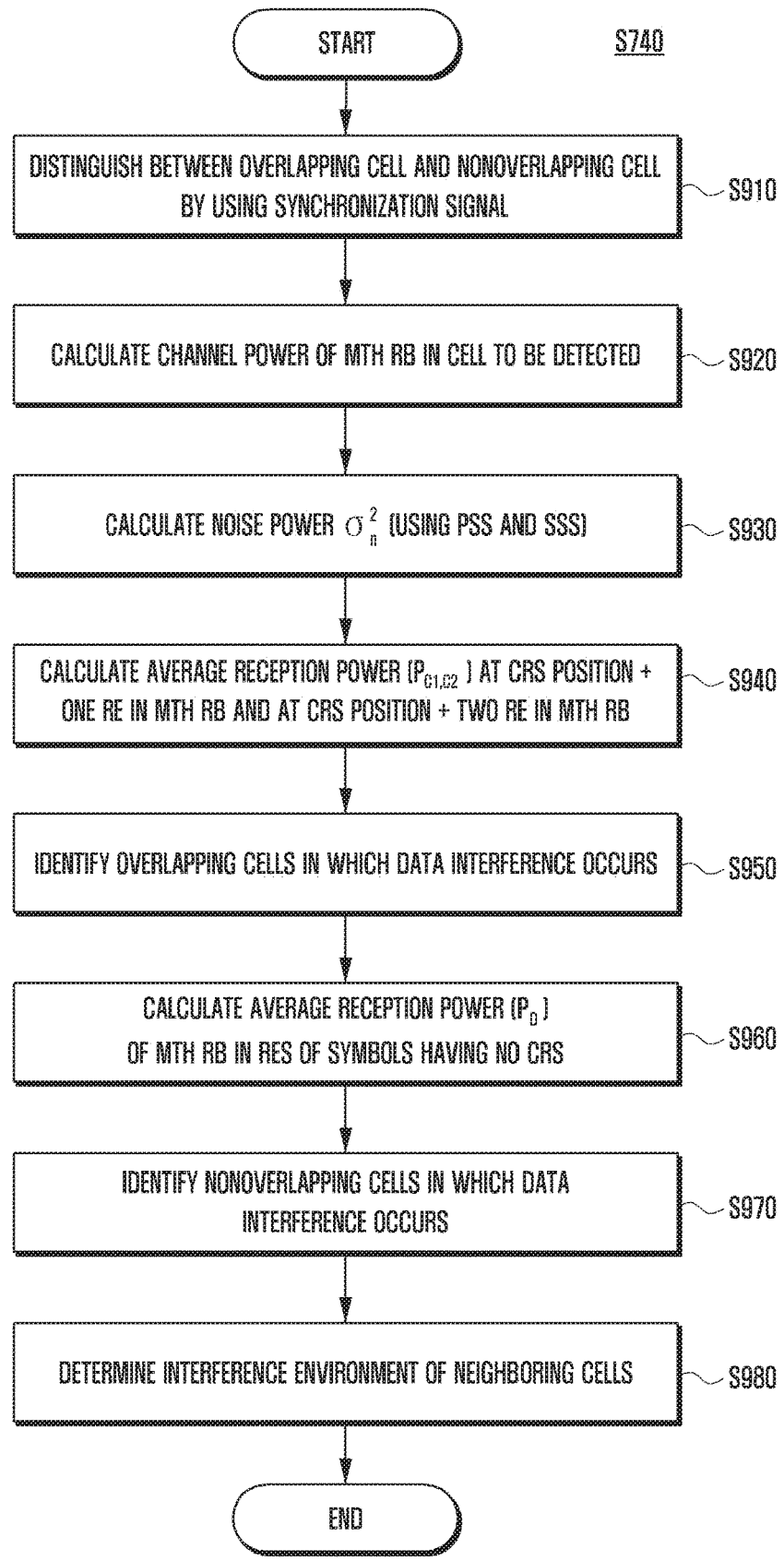
FIG. 9 is a flowchart illustrating a method for determining an interference environment of neighboring cells according to a second embodiment of the disclosure.

FIG. 9 is a flowchart illustrating a method for determining an interference environment of neighboring cells according to a second embodiment of the disclosure.

The method for determining the interference environment of the neighboring cells according to the second embodiment of the disclosure is briefly described as follows. A base station may identify cells in which data interference occurs among CRS-overlapping cells. Further, the base station may identify cells in which data interference occurs among CRS-nonoverlapping cells and may determine an interference environment of neighboring cells.

Operations according to the second embodiment of the disclosure are described in detail below with reference to FIG. 9.

First, in operation S910, the base station may distinguish between a CRS-overlapping cell and a CRS-nonoverlapping cell using a synchronization signal. Operation S910 may correspond to operation S810.

In operation S920, the base station may calculate the channel power ($S_{i,m}$) of an $m^{th}$ RB in allocated RBs of an ith cell to be detected by the base station. Operation S920 may correspond to operation S820.

In operation S930, the base station may calculate noise power. Operation S930 may correspond to operation S830.

In operation S940, the base station may calculate an average reception power value ($P_{C1}$) measured in an RE at a position increased by one RE from the position of a resource for transmitting the CRS in the $m^{th}$ RB and an average reception power value ($P_{C2}$) measured in an RE at a position increased by two REs from the position of the resource for transmitting the CRS in the $m^{th}$ RB. The average reception powers ($P_{C1}$ and $P_{C2}$) are calculated using the following equation.

$$P_{C1} = \frac{1}{N_{C1}} \sum_k |y_k|^2 \text{ for } k \in mth \text{ RB } CRS \text{ position}+1 \qquad \text{Equation 18}$$

$$P_{C2} = \frac{1}{N_{C2}} \sum_k |y_k|^2 \text{ for } k \in mth \text{ RB } CRS \text{ position}+2 \qquad \text{Equation 19}$$

In operation S950, the base station may identify cells in which data interference occurs among the CRS-overlapping cells. The base station may use the average reception powers ($P_{C1}$ and $P_{C2}$), the channel power, the noise power, and the channel power of the CRS-nonoverlapping cells. The cells in which data interference occurs in a CRS-overlapping environment may be identified using the following equation.

$$\hat{C}_{OL,D} = \arg_{M_{OL,j}} \min \left| P_{C1} + P_{C2} - 2S_i - \sum_{k \in C_{NOL}} S_k - 2\sigma_n^2 - \sum_{j' M_{NOL,j}} S_{j'} \right| \qquad \text{Equation 20}$$

Equation 20 may be satisfied by a set of cells in which data interference occurs among the CRS-overlapping cells. The set of the cells may correspond to the interference environment described in connection with FIG. 4. Therefore, cells other than the cells in which data interference occurs among the CRS-nonoverlapping cells may correspond to the interference environment described in connection with FIG. 3.

In operation S960, the base station may calculate the average reception power ($P_D$) of the $m^{th}$ RB in REs of symbols having no CRS. The average reception power ($P_D$) is calculated using Equation 16.

In operation S970, the base station may identify cells in which data interference occurs among the CRS-nonoverlapping cells. The base station may use the average reception power ($P_D$), the channel power, the noise power, and the channel power of the cells ($\hat{C}_{OL,D}$) in which data interference occurs among the CRS-overlapping cells, which can be identified in operation S950. The cells in which data interference occurs in a CRS-nonoverlapping environment may be identified using the following equation.

$$\hat{C}_{NOL,D} = \qquad\qquad\text{Equation 21}$$
$$\arg_{M_{NOL,j}}\min\left|P_D - S_i - \sum_{k \in \hat{C}_{OL,D}} S_k - \sum_{j' \in M_{NOL,j}} S_{j'} - \sigma_n^2\right|$$

Equation 21 may be satisfied by a set of cells in which data interference occurs among the CRS-nonoverlapping cells. The set of the cells may correspond to the interference environment described in connection with FIG. 6. Therefore, cells other than the cells in which data interference occurs among the CRS-nonoverlapping cells may correspond to the interference environment described in connection with FIG. 5.

In operation S980, the base station may determine an interference environment of the neighboring cells using the results of operation 950 and operation S970. Operation S980 may correspond to operation S880.

Figure 10:
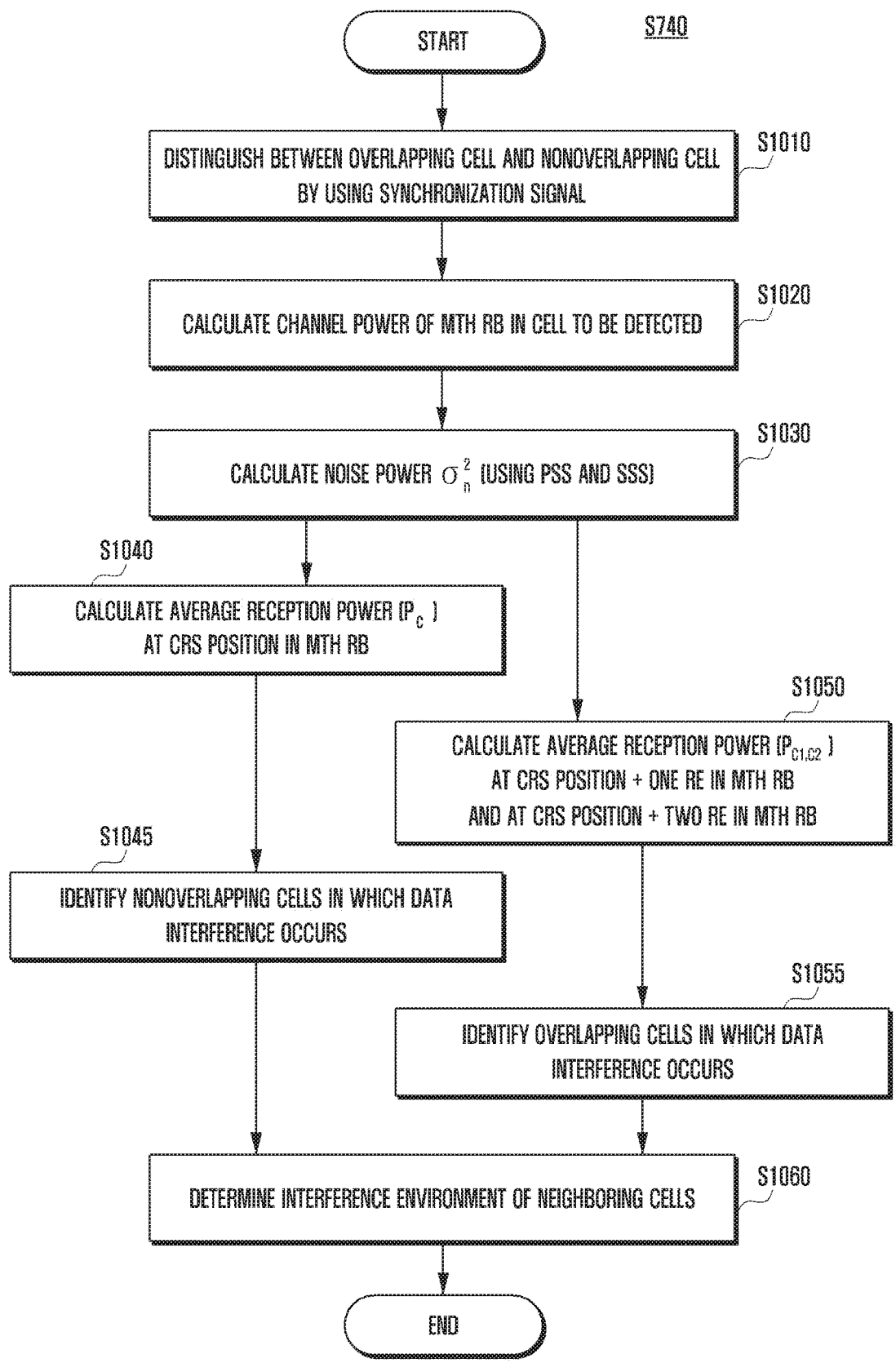
FIG. 10 is a flowchart illustrating a method for determining an interference environment of neighboring cells according to a third embodiment of the disclosure.

FIG. 10 is a flowchart illustrating a method for determining an interference environment of neighboring cells according to a third embodiment of the disclosure.

The method for determining the interference environment of the neighboring cells according to the third embodiment of the disclosure is briefly described as follows. A base station may simultaneously identify cells in which data interference occurs among CRS-nonoverlapping cells and cells in which data interference occurs among CRS-overlapping cells and may determine an interference environment of neighboring cells.

Operations according to the third embodiment of the disclosure are described in detail below with reference to FIG. 10.

First, in operation S1010, the base station may distinguish between a CRS-overlapping cell and a CRS-nonoverlapping cell using a synchronization signal. Operation S1010 may correspond to operation S810.

In operation S1020, the base station may calculate the channel power ($S_{i,m}$) of an $m^{th}$ RB in allocated RBs of an ith cell to be detected by the base station. Operation S1020 may correspond to operation S820.

In operation S1030, the base station may calculate noise power. Operation S1030 may correspond to operation S830.

In operation S1040, the base station may calculate an average reception power value ($P_C$) measured at the position of a resource for transmitting the CRS in the $m^{th}$ RB. The average reception power ($P_C$) is calculated using Equation 14.

In operation S1045, the base station may identify cells in which data interference occurs among the CRS-nonoverlapping cells. Operation S1045 may correspond to operation S850.

In operation S1055, the base station may calculate an average reception power value ($P_{C1}$) measured in an RE at a position increased by one RE from the position of a resource for transmitting the CRS in the $m^{th}$ RB and an average reception power value ($P_{C2}$) measured in an RE at a position increased by two REs from the position of the resource for transmitting the CRS in the $m^{th}$ RB.

The average reception powers ($P_{C1}$ and $P_{C2}$) are calculated using Equation 18 and Equation 19.

In operation S1055, the base station may identify cells in which data interference occurs among the CRS-overlapping cells. Operation S1055 may correspond to operation S950.

In operation S1060, the base station may determine an interference environment of the neighboring cells using the results of operation S1045 and operation S1055. Operation S1060 may correspond to operation S880.

FIG. 11 illustrates a method of applying an MMSE weight according to an interference environment determined according to embodiments of the disclosure.

First, a base station may calculate interference power ($I_m$) at the position of a resource for transmitting a CRS for applying an MMSE to an ith cell, which is a serving cell. The interference power ($I_m$) may be calculated as follows.

$$I_m = \frac{1}{N_C}\sum_k\left|y_k - \hat{H}_{i,k}s_{i,k}\right|^2, \text{ for } k \in CRS \text{ position in } mth\ RB \qquad\text{Equation 22}$$

The base station may differently apply the calculated interference power ($I_m$) to an MMSE weight for PDSCH detection according to an interference environment in order to reduce the impact of an interfering cell. In operation S1122, the base station may apply different interference power to the MMSE weight.

The base station may use the interference environments of the neighboring cells determined in operation S740, operation S880, operation S980, and operation S1060 in order to apply the MMSE weight.

In operation S1110, the base station may distinguish whether the positions of resources for transmitting CRSs of a serving cell and an interfering cell overlap. When the positions of the resources for transmitting the CRSs of the serving cell and the interfering cell overlap, operation S1120 may be performed.

In operation S1120, the base station may distinguish whether the positions of resources for transmitting data of the serving cell and the interfering cell overlap. When the positions of the resources for transmitting the data of the serving cell and the interfering cell overlap, operation S1121 may be performed.

In operation S1121, the base station may perform data detection using the interference power ($I_m$) calculated at the position of the resource for transmitting the CRS. While performing the data detection, the base station may detect a PDSCH by applying an MMSE weight. When the interfering cell corresponds to a CRS-overlapping cell and the PDSCH receives interference from the interfering cell, the following equation may be applied to the MMSE weight.

$$w_k = \frac{\hat{H}_{i,k}^*}{\left|\hat{H}_{i,k}\right|^2 + I_m} \qquad\text{Equation 23}$$

When the positions of resources for transmitting the data of the serving cell and the interfering cell do not overlap in operation S1120, operation S1122 may be performed. In operation S1122, the base station may perform data detection using interference power from which interference of a cell in which the positions of the resources for transmitting the CRSs overlap and no data interference occurs is eliminated.

While performing the data detection, the base station may detect a PDSCH by applying an MMSE weight. When the interfering cell corresponds to a CRS-overlapping cell and only CRS interference from the interfering cell occurs, the following equation may be applied to the MMSE weight.

$$w_k = \frac{\hat{H}^*_{i,k}}{|\hat{H}_{i,k}|^2 + I_m - \frac{1}{N_C}\sum_{j \notin \hat{C}_{OL}}\sum_k |\hat{H}_{j,k}|} \qquad \text{Equation 24}$$

When the positions of the resources for transmitting the CRSs of the serving cell and the interfering cell do not overlap in operation S1110, operation S1130 may be performed. In operation S1130, the base station may distinguish whether the positions of resources for transmitting data of the serving cell and the interfering cell overlap.

When the positions of the resources for transmitting the data of the serving cell and the interfering cell overlap, operation S1131 may be performed. In operation S1131, the base station may perform data detection using the interference power ($I_m$) calculated at the position of the resource for transmitting the CRS.

While performing the data detection, the base station may detect a PDSCH by applying an MMSE weight. When the interfering cell corresponds to a CRS-nonoverlapping cell and the PDSCH receives interference from the interfering cell, Equation 23 may be applied to the MMSE weight.

When the positions of resources for transmitting the data of the serving cell and the interfering cell do not overlap in operation S1130, operation S1132 may be performed. In operation S1132, the base station may detect data by distinguishing between an RE for transmitting a PDSCH having CRS interference and an RE that is not for transmitting the PDSCH.

When data of an RE for transmitting a PDSCH having CRS interference is detected in operation S1132, the base station may use the interference power ($I_m$) calculated at the position of the resource for transmitting the CRS and the channel power of the CRS-nonoverlapping cell.

The base station may detect the PDSCH by applying an MMSE weight. When the interfering cell corresponds to a CRS-nonoverlapping cell and the data of the RE for transmitting the PDSCH having CRS interference is detected in the case where only CRS interference occurs from the interfering cell, the following equation may be used to obtain the MMSE weight.

$$w_k = \frac{\hat{H}^*_{i,k}}{|\hat{H}_{i,k}|^2 + I_m + \frac{1}{N_C}\sum_{j \notin \hat{C}_{NOL}}\sum_k |\hat{H}_{j,k}|}, \qquad \text{Equation 25}$$

for $k \in$ PDSCH position receiving CRS interference

When data of an RE for transmitting a PDSCH in which CRS interference does not occur is detected in operation S1132, the base station may use the interference power ($I_m$) calculated at the position of the resource for transmitting the CRS.

The base station may detect the PDSCH by applying an MMSE weight. When the interfering cell corresponds to a CRS-nonoverlapping cell and the data of the RE for transmitting the PDSCH having no CRS interference is detected in the case where only CRS interference occurs from the interfering cell, the following equation may be applied to the MMSE weight.

$$w_k = \frac{\hat{H}^*_{i,k}}{|\hat{H}_{i,k}|^2 + I_m}, \text{ for } k \in \text{other PDSCH positions} \qquad \text{Equation 26}$$

Figure 12:
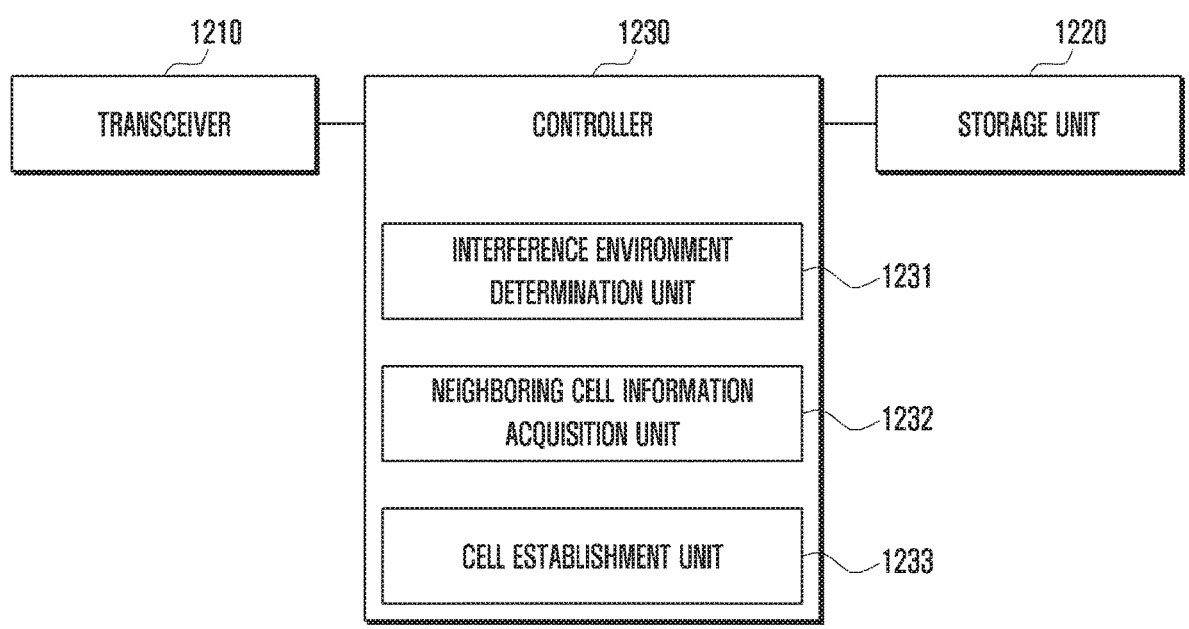
FIG. 12 is a block diagram illustrating the internal structure of a base station according to the disclosure.

FIG. 12 is a block diagram illustrating the internal structure of a base station according to the disclosure. As illustrated in 10, the base station of the disclosure may include a transceiver 1210, a storage unit 1220, and a controller 1230.

The transceiver 1210 of the base station performs message transmission and reception between the base station and a terminal or between the base station and neighboring cells of the base station. To this end, the transceiver 1210 may include a wired or wireless interface.

According to the disclosure, the storage unit 1220 of the base station may store information about an interference environment of neighboring interference cells with respect to a serving cell and information about neighboring cells of the base station. According to embodiments of the disclosure, the storage unit 1220 may particularly store interference environment information of neighboring cells determined by an interference environment determination unit 1231 of the controller 1230. Further, the storage unit 1220 may store system information of neighboring cells obtained by a neighboring cell information acquisition unit 1232 of the controller 1230 detecting a PDSCH of the serving cell.

The controller 1230 of the base station may control the overall operation of the base station. In particular, the controller 1230 may further include the interference environment determination unit 1231 that determines the interference environment of neighboring cells, the neighboring cell information acquisition unit 1232 that detects a PDSCH of the serving cell and obtains system information of the neighboring cells from an SIB, and a cell establishment unit 1233 that establishes a cell of the base station using the system information of the neighboring cells.

The interference environment determination unit 1231 may determine an interference environment of neighboring cells. The interference environment determination unit 1231 may determine an interference environment of neighboring cells as an interference environment corresponding to FIG. 3 to FIG. 6.

According to the first embodiment of the disclosure, the base station may distinguish between CRS-overlapping cells and CRS-nonoverlapping cells using a synchronization signal of neighboring cells. The base station may divide the CRS-nonoverlapping cells into cells in which data interference occurs and cells in which data interference does not occur. Further, the base station may divide the CRS-overlapping cells into cells in which data interference occurs and cells in which data interference does not occur. The base station may determine the interference environment of the neighboring cells to be an interference environment corresponding to FIG. 3 to FIG. 6 using the result of division.

According to the second embodiment of the disclosure, the base station may distinguish between CRS-overlapping cells and CRS-nonoverlapping cells using a synchronization signal of neighboring cells. The base station may divide the CRS-overlapping cells into cells in which data interference occurs and cells in which data interference does not occur. Further, the base station may divide the CRS-nonoverlapping cells into cells in which data interference occurs and cells in which data interference does not occur. The base station may determine the interference environment of the neighboring cells to be the interference environment corresponding to FIG. 3 to FIG. 6 using the result of division.

According to the third embodiment of the disclosure, the base station may distinguish between CRS-overlapping cells and CRS-nonoverlapping cells using a synchronization signal of neighboring cells. The base station may simultaneously distinguish a cell in which data interference occurs among the CRS-nonoverlapping cells and a cell in which data interference occurs among the CRS-overlapping cells. The base station may determine the interference environment of the neighboring cells to be an interference environment corresponding to FIG. 3 to FIG. 6 using the distinguishing result.

The neighboring cell information acquisition unit 1232 may obtain system information of neighboring cells by detecting a PDSCH. The neighboring cell information acquisition unit 1232 may use an interference environment result determined by the interference environment determination unit 1231 when detecting the PDSCH. In addition, the neighboring cell information acquisition unit 1232 may apply an MMSE weight based on the interference environment result.

According to the disclosure, the base station may calculate interference power ($I_m$) at the position of a resource for transmitting a CRS for applying an MMSE to an ith cell, which is a serving cell. The base station may differently apply the calculated interference power ($I_m$) to an MMSE weight for PDSCH detection according to an interference environment in order to reduce the impact of an interfering cell. The base station may use the interference environment result, determined by the interference environment determination unit 1231, in order to apply the MMSE weight. The neighboring cell information acquisition unit 1232 may detect a PDSCH using the MMSE weight, thereby identifying system information of neighboring cells.

The cell establishment unit 1233 may establish a cell of the base station using the system information of the neighboring cells. The cell establishment unit 1233 may establish the cell using the information while minimizing the impact of the neighboring cells from an SIB.

The embodiments of the disclosure disclosed in the specification and drawings are only intended to provide specific examples for easily describing the technical content of the disclosure and for assisting understanding of the disclosure, and are not intended to limit the scope of the disclosure. It will be apparent to those skilled in the art to which the disclosure pertains that other modifications based on the technical idea of the disclosure may be implemented in addition to the embodiments disclosed herein.

The invention claimed is:

1. A method for establishing, by a base station, a cell in a wireless communication system, the method comprising:
   detecting cell IDs of neighboring cells using synchronization signals transmitted from the neighboring cells;
   identifying, based on the cell IDs, whether resources for common reference signals (CRSs) transmitted from the neighboring cells overlap each other;
   estimating channels of the neighboring cells using the CRSs;
   determining an interference environment of the neighboring cells by using the estimated channels;
   calculating an interference power at a position of a CRS transmitted from at least one of the neighboring cells based on the determined interference environment of the neighboring cells; and
   obtaining system information about at least one cell by applying a minimum mean square error (MMSE) weight determined based on the interference power.

2. The method as claimed in claim 1, wherein the identifying comprises identifying whether the resources for transmitting the CRSs overlap by comparing remainders obtained by dividing the detected cell IDs by a previously input value.

3. The method as claimed in claim 1, wherein the determining of the interference environment comprises determining the interference environment based on whether the resources for transmitting the CRSs from the neighboring cells overlap and whether resources for transmitting data from the neighboring cells overlap.

4. The method as claimed in claim 3, wherein the determining of the interference environment comprises one of:
   identifying cells for which the resources for transmitting the data overlap among cells for which the resources for transmitting the CRSs do not overlap and identifying cells for which the resources for transmitting the data overlap among cells for which the resources for transmitting the CRSs overlap;
   identifying cells for which the resources for transmitting the data overlap among the cells for which the resources for transmitting the CRSs overlap and identifying cells for which the resources for transmitting the data overlap among the cells for which the resources for transmitting the CRSs do not overlap; or
   simultaneously identifying cells for which the resources for transmitting the data overlap among the cells for which the resources for transmitting the CRSs do not overlap and the cells for which the resources for transmitting the data overlap at once.

5. The method as claimed in claim 4,
   wherein the identifying of the cells for which the resources for transmitting the data overlap among the cells for which the resources for transmitting the CRSs do not overlap and the identifying the cells for which the resources for transmitting the data overlap among the cells for which the resources for transmitting the CRSs overlap comprises:
   calculating a channel power ($S_{i,m}$) in an $m^{th}$ resource block (RB) of an $i^{th}$ cell;
   calculating a noise power ($\sigma_n^2$) in the RB;
   calculating an average reception power ($P_C$) at a position of a resource for transmitting a CRS in the $m^{th}$ RB;
   identifying the cells for which the resources for transmitting the data overlap among the cells for which the resources for transmitting the CRSs do not overlap by using the average reception power ($P_C$), the channel power, the noise power, and a channel power of the cells for which the resources for transmitting the CRSs overlap;
   calculating an average reception power ($P_D$) in resource elements (REs) of symbols on which no CRS is transmitted in the $m^{th}$ RB; and
   identifying the cells for which the resources for transmitting the data overlap among the cells for which the resources for transmitting the CRSs overlap by using the average reception power ($P_D$), the channel power, the noise power, and a channel power of the identified cells for which the resources for transmitting the data overlap among the cells for which the resources for transmitting the CRSs do not overlap, and wherein the calculating of the noise power comprises one of:
  calculating the noise power by eliminating all CRSs overlapping at a position of a resource for transmitting a CRS; or
  calculating the noise power by accumulating powers of ten emptied REs among 72 REs allocated in regions of a primary synchronization signal (PSS) and a secondary synchronization signal (SSS) or by determining the emptied RBs.

6. The method as claimed in claim 4,
wherein the identifying of the cells for which the resources for transmitting the data overlap among the cells for which the resources for transmitting the CRSs overlap and the identifying the cells for which the resources for transmitting the data overlap among the cells for which the resources for transmitting the CRSs do not overlap comprises:
  calculating a channel power ($S_{i,m}$) in an $m^{th}$ RB of an $i^{th}$ cell;
  calculating a noise power ($\sigma_n^2$) in the RB;
  calculating an average reception power ($P_{C1}$) in an RE at a position increased by one RE from a position of a resource for transmitting a CRS in the $m^{th}$ RB and an average reception power ($P_{C2}$) in an RE at a position increased by two REs from the position of the resource for transmitting the CRS in the $m^{th}$ RB;
  identifying the cells for which the resources for transmitting the data overlap among the cells for which the resources for transmitting the CRSs overlap by using the average reception powers ($P_{C1}$ and $P_{C2}$), the channel power, the noise power, and a channel power of the cells for which the resources for transmitting the CRSs do not overlap;
  calculating an average reception power ($P_D$) in REs of symbols on which no CRS is transmitted in the $m^{th}$ RB; and
  identifying the cells for which the resources for transmitting the data overlap among the cells for which the resources for transmitting the CRSs do not overlap by using the average reception power ($P_D$), the channel power, the noise power, and a channel power of the identified cells for which the resources for transmitting the data overlap among the cells for which the resources for transmitting the CRSs overlap, and
wherein the calculating of the noise power comprises one of:
  calculating the noise power by eliminating all CRSs overlapping at a position of a resource for transmitting a CRS; or
  calculating the noise power by accumulating powers of ten emptied REs among 72 REs allocated in regions of a primary synchronization signal (PSS) and a secondary synchronization signal (SSS) or by determining the emptied RBs.

7. The method as claimed in claim 4,
wherein the simultaneously identifying of the cells for which the resources for transmitting the data overlap among the cells for which the resources for transmitting the CRSs do not overlap and the cells for which the resources for transmitting the data overlap comprises:
  calculating a channel power ($S_{i,m}$) in an $m^{th}$ resource block (RB) of an $i^{th}$ cell;
  calculating a noise power ($\sigma_n^2$) in the RB;
  calculating an average reception power ($P_C$) at a position of a resource for transmitting a CRS in the $m^{th}$ RB;
  identifying the cells for which the resources for transmitting the data overlap among the cells for which the resources for transmitting the CRSs do not overlap by using the average reception power ($P_C$), the channel power, the noise power, and a channel power of the cells for which the resources for transmitting the CRSs overlap;
  calculating an average reception power ($P_{C1}$) in an RE at a position increased by one RE from a position of a resource for transmitting a CRS in the $m^{th}$ RB and an average reception power ($P_{C2}$) in an RE at a position increased by two REs from the position of the resource for transmitting the CRS in the $m^{th}$ RB; and
  identifying the cells for which the resources for transmitting the data overlap among the cells for which the resources for transmitting the CRSs overlap by using the average reception powers ($P_{C1}$ and $P_{C2}$), the channel power, the noise power, and a channel power of the cells for which the resources for transmitting the CRSs do not overlap, and
wherein the calculating of the noise power comprises one of:
  calculating the noise power by eliminating all CRSs overlapping at a position of a resource for transmitting a CRS; or
  calculating the noise power by accumulating powers of ten emptied REs among 72 REs allocated in regions of a primary synchronization signal (PSS) and a secondary synchronization signal (SSS) or by determining the emptied RBs.

8. The method as claimed in claim 1, further comprising:
determining the MMSE weight using the interference power; and
establishing a cell of the base station using the obtained system information.

9. A base station for establishing a cell in a wireless communication system, the base station comprising:
  a transceiver configured to transmit and receive a signal from a neighboring cell;
  a controller configured to detect cell IDs of neighboring cells by using synchronization signals transmitted from the neighboring cells, to identify, based on the cell IDs, whether resources for common reference signals (CRSs) transmitted from the neighboring cells overlap each other, to estimate channels of the neighboring cells by using the CRSs, and to determine an interference environment of the neighboring cells by using the estimated channels; and
  a storage unit configured to store information obtained by detecting a signal received from the neighboring cells,
wherein the controller comprises a neighboring cell information acquisition unit configured to calculate an interference power at a position of a CRS transmitted from at least one of the neighboring cells, and to obtain system information about at least one cell by applying a minimum mean square error (MMSE) weight determined based on the interference power.

10. The base station as claimed in claim 9, wherein the controller further comprises an interference environment determination unit configured to identify whether the resources for transmitting the CRSs overlap by comparing remainders obtained by dividing the detected cell IDs by a previously input value.

11. The base station as claimed in claim 9,
wherein the controller further comprises an interference environment determination unit configured to determine the interference environment based on whether the resources for transmitting the CRSs from the neighboring cells overlap and whether resources for transmitting data from the neighboring cells overlap, and
wherein the interference environment determination unit performs one of:
- identifying cells for which the resources for transmitting the data overlap among cells for which the resources for transmitting the CRSs do not overlap and identifying cells for which the resources for transmitting the data overlap among cells for which the resources for transmitting the CRSs overlap;
- identifying cells for which the resources for transmitting the data overlap among the cells for which the resources for transmitting the CRSs overlap and identifying cells for which the resources for transmitting the data overlap among the cells for which the resources for transmitting the CRSs do not overlap; or
- simultaneously identifying cells for which the resources for transmitting the data overlap among the cells for which the resources for transmitting the CRSs do not overlap and the cells for which the resources for transmitting the data overlap.

12. The base station as claimed in claim 11,
wherein the identifying of the cells for which the resources for transmitting the data overlap among the cells for which the resources for transmitting the CRSs do not overlap and the identifying of the cells for which the resources for transmitting the data overlap among the cells for which the resources for transmitting the CRSs overlap comprises:
- calculating a channel power ($S_{i,m}$) in an $m^{th}$ resource block (RB) of an $i^{th}$ cell;
- calculating a noise power ($\sigma_n^2$) in the RB;
- calculating an average reception power ($P_C$) at a position of a resource for transmitting a CRS in the $m^{th}$ RB;
- identifying the cells for which the resources for transmitting the data overlap among the cells for which the resources for transmitting the CRSs do not overlap by using the average reception power ($P_C$), the channel power, the noise power, and a channel power of the cells for which the resources for transmitting the CRSs overlap;
- calculating an average reception power ($P_D$) in resource elements (REs) of symbols on which no CRS is transmitted in the $m^{th}$ RB; and
- identifying the cells for which the resources for transmitting the data overlap among the cells for which the resources for transmitting the CRSs overlap by using the average reception power ($P_D$), the channel power, the noise power, and a channel power of the identified cells for which the resources for transmitting the data overlap among the cells for which the resources for transmitting the CRSs do not overlap, and
wherein the calculating of the noise power comprises one of:
- calculating the noise power by eliminating all CRSs overlapping at a position of a resource for transmitting a CRS; or
- calculating the noise power by accumulating powers of ten emptied REs among 72 REs allocated in regions of a primary synchronization signal (PSS) and a secondary synchronization signal (SSS) or by determining the emptied RBs.

13. The base station as claimed in claim 11,
wherein the identifying of the cells for which the resources for transmitting the data overlap among the cells for which the resources for transmitting the CRSs overlap and the identifying of the cells for which the resources for transmitting the data overlap among the cells for which the resources for transmitting the CRSs do not overlap comprises:
- calculating a channel power ($S_{i,m}$) in an $m^{th}$ RB of an $i^{th}$ cell;
- calculating a noise power ($\sigma_n^2$) in the RB;
- calculating an average reception power ($P_{C1}$) in an RE at a position increased by one RE from a position of a resource for transmitting a CRS in the $m^{th}$ RB and an average reception power ($P_{C2}$) in an RE at a position increased by two REs from the position of the resource for transmitting the CRS in the $m^{th}$ RB;
- identifying the cells for which the resources for transmitting the data overlap among the cells for which the resources for transmitting the CRSs overlap by using the average reception powers ($P_{C1}$ and $P_{C2}$), the channel power, the noise power, and a channel power of the cells for which the resources for transmitting the CRSs do not overlap;
- calculating an average reception power ($P_D$) in REs of symbols on which no CRS is transmitted in the $m^{th}$RB; and
- identifying the cells for which the resources for transmitting the data overlap among the cells for which the resources for transmitting the CRSs do not overlap by using the average reception power ($P_D$), the channel power, the noise power, and a channel power of the identified cells for which the resources for transmitting the data overlap among the cells for which the resources for transmitting the CRSs overlap, and
wherein the calculating of the noise power comprises one of:
- calculating the noise power by eliminating all CRSs overlapping at a position of a resource for transmitting a CRS; or
- calculating the noise power by accumulating powers of ten emptied REs among 72 REs allocated in regions of a primary synchronization signal (PSS) and a secondary synchronization signal (SSS) or by determining the emptied RBs.

14. The base station as claimed in claim 11,
wherein the simultaneously identifying of the cells for which the resources for transmitting the data overlap among the cells for which the resources for transmitting the CRSs do not overlap and the cells for which the resources for transmitting the data overlap comprises:
- calculating a channel power ($S_{i,m}$) in an $m^{th}$ resource block (RB) of an $i^{th}$ cell;
- calculating a noise power ($\sigma_n^2$) in the RB;
- calculating an average reception power ($P_C$) at a position of a resource for transmitting a CRS in the $m^{th}$ RB;
- identifying the cells for which the resources for transmitting the data overlap among the cells for which the resources for transmitting the CRSs do not overlap by using the average reception power ($P_C$), the channel power, the noise power, and a channel power of the cells for which the resources for transmitting the CRSs overlap;

calculating an average reception power ($P_{C1}$) in an RE at a position increased by one RE from a position of a resource for transmitting a CRS in the $m^{th}$ RB and an average reception power ($P_{C2}$) in an RE at a position increased by two REs from the position of the resource for transmitting the CRS in the $m^{th}$ RB; and identifying the cells for which the resources for transmitting the data overlap among the cells for which the resources for transmitting the CRSs overlap by using the average reception powers ($P_{C1}$ and $P_{C2}$), the channel power, the noise power, and a channel power of the cells for which the resources for transmitting the CRSs do not overlap, and wherein the calculating of the noise power comprises one of:
- calculating the noise power by eliminating all CRSs overlapping at a position of a resource for transmitting a CRS; or
- calculating the noise power by accumulating powers of ten emptied REs among 72 REs allocated in regions of a primary synchronization signal (PSS) and a secondary synchronization signal (SSS) or by determining the emptied RBs.

15. The base station as claimed in claim 9,
wherein the controller further comprises:
a cell establishment unit configured to establish a cell of the base station using the obtained system information, and
wherein the neighboring cell information acquisition unit determines the MMSE weight by using the interference power.

\* \* \* \* \*